US 7,139,243 B2

(12) United States Patent  (10) Patent No.: US 7,139,243 B2
Okumura  (45) Date of Patent: Nov. 21, 2006

(54) DATA TRANSMISSION METHOD, DATA TRANSMISSION SYSTEM, TRANSMITTER AND RECEIVER

(75) Inventor: Yukihiko Okumura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 883 days.

(21) Appl. No.: 09/998,601

(22) Filed: Nov. 16, 2001

(65) Prior Publication Data
US 2002/0075964 A1 Jun. 20, 2002

(30) Foreign Application Priority Data
Nov. 17, 2000 (JP) ............................. 2000-351884

(51) Int. Cl.
*G01R 31/08* (2006.01)
*H04B 7/00* (2006.01)
*H04B 1/44* (2006.01)

(52) U.S. Cl. ...................... 370/248; 370/278; 370/282

(58) Field of Classification Search ............... 370/248, 370/242–245, 252, 278, 282; 375/240.27; 714/758, 751, 712, 703
See application file for complete search history.

(56) References Cited

U.S. PATENT DOCUMENTS

| 5,600,662 A | * | 2/1997 | Zook | 714/769 |
| 5,638,384 A | | 6/1997 | Hayashi et al. | 371/37.1 |
| 5,896,374 A | | 4/1999 | Okumura et al. | 370/311 |
| 6,108,384 A | | 8/2000 | Okumura et al. | 375/262 |
| 6,292,484 B1 | * | 9/2001 | Oliver | 370/389 |

FOREIGN PATENT DOCUMENTS

EP  1 100 204 A1  5/2001

(Continued)

OTHER PUBLICATIONS

"A Scheme to Measure Quality for Outer Loop TPC During DPDCH OFF", TSG-RAN Working Group 1 Meeting #9, Dresden, Germany, Nov. 30-Dec. 3, 1999, TSGR1#9(99)j78.

(Continued)

*Primary Examiner*—Ricky Q. Ngo
*Assistant Examiner*—Warner Wong
(74) *Attorney, Agent, or Firm*—Workman Nydegger

(57) ABSTRACT

A data transmission method etc. is provided. At a transmitting side, if a frame contains transmission data, frame data containing the transmission data and a calculated error-detecting code is generated. If the frame contains no transmission data, frame data containing neither transmission data nor an error-detecting code is generated. At a receiving side, one or more final bit positions of the frame data are assumed in the frame, transmission data and an error-detecting code are assumed in the frame, and the error-detecting code of the assumed transmission data is calculated. If there is a position where the assumed error-detecting code matches the error-detecting code calculated based on the assumed transmission data, it is decided that the position is the final bit position. Otherwise, it is decided that the frame contains no transmission data or that the received frame data contains an error.

5 Claims, 24 Drawing Sheets

FOREIGN PATENT DOCUMENTS

| | | |
|---|---|---|
| EP | 1 107 499 A1 | 6/2001 |
| JP | 07-336364 | 12/1995 |
| JP | WO96/26582 | 8/1996 |
| JP | 09238352 A | 9/1997 |
| JP | WO97/50219 | 12/1997 |
| JP | 10-065655 | 6/1998 |
| JP | 10-262015 | 9/1998 |
| JP | 11-308660 | 11/1999 |
| JP | WO00/69079 | 11/2000 |
| JP | WO00/79720 A1 | 12/2000 |
| JP | 2001-007784 | 1/2001 |
| JP | 2002-158642 | 5/2002 |

OTHER PUBLICATIONS

"CR for Parity Bit Attachment to 0 Bit Transport Block", TSG-RAN Working Group 1 Meeting #9, Dresden, Germany, Nov. 30-Dec. 3, 1999, TSGR1#9(99)L34.

Ad Hoc #4 Chair, "Second Ad Hoc #4 Meeting Report", TSGR1#5(99)723, TSG-RAN Working Group 1 meeting #5, Cheju, South Korea, Jun. 1-4, 1999.

NTT DoCoMo, "CRC Position", TSGR1 #5(99)689, TSG-RAN Working Group 1 Meeting #5, Cheju, Korea, Jun. 1-4, 1999.

Official Notice of Rejection: Case No. DCMH120306; Patent Application No. 2000-351884.

* cited by examiner

○ TRANSMISSION BIT ORDER (D0 TO D9 SHOW TRANSMISSION DATA, C4 TO C0 SHOW CRC BITS)

CONVENTIONAL POSTPOSITION : D9,D8,D7,D6,D5,D4,D3,D2,D1,D0,C4,C3,C2,C1,C0

PREPOSITION : C4,C3,C2,C1,C0,D9,D8,D7,D6,D5,D4,D3,D2,D1,D0

FIG.1A

○ RECEIVED DATA BIT AND RECEIVED CRC BIT
(WHEN DETECTING A POSITION WHERE THE NUMBER OF BITS IS
SMALLER BY ONE FROM THE CORRECT RATE POSITION)

CONVENTIONAL POSTPOSITION: DATA = D9,D8,D7,D6,D5,D4,D3,D2,D1   CRC=D0,C4,C3,C2,C1

PREPOSITION: DATA = D9,D8,D7,D6,D5,D4,D3,D2,D1   CRC=C4,C3,C2,C1,C0

FIG.1B

○TRANSMISSION BIT ORDER (D0 TO D9 SHOW TRANSMISSION DATA, C4 TO C0 SHOW CRC BITS)

CONVENTIONAL POSTPOSITION : D9,D8,D7,D6,D5,D4,D3,D2,D1,D0,C4,C3,C2,C1,C0

NEW POSTPOSITION : D9,D8,D7,D6,D5,D4,D3,D2,D1,D0,C0,C1,C2,C3,C4

FIG.2A

○RECEIVED DATA BIT AND RECEIVED CRC BIT
(WHEN DETECTING A POSITION WHERE THE NUMBER OF BITS IS SMALLER BY ONE FROM THE CORRECT RATE POSITION)

CONVENTIONAL POSTPOSITION: DATA =D9,D8,D7,D6,D5,D4,D3,D2,D1  CRC=D0,C4,C3,C2,C1

NEW POSTPOSITION: DATA =D9,D8,D7,D6,D5,D4,D3,D2,D1  CRC=D0,C0,C1,C2,C3

FIG.2B

TRANSMITTER CONFIGURATION

RECEIVER CONFIGURATION

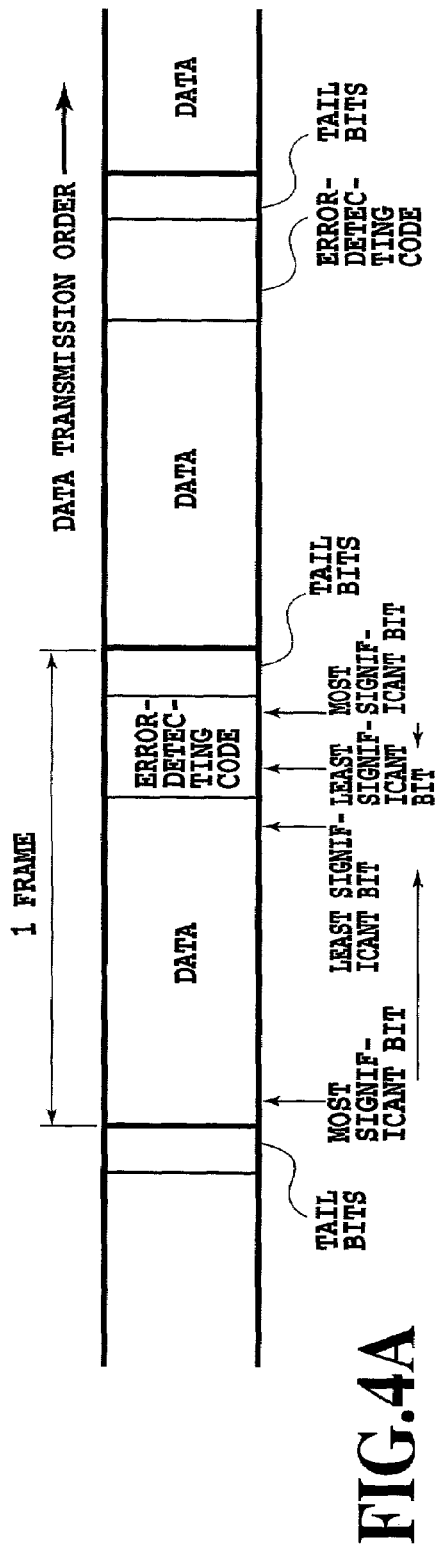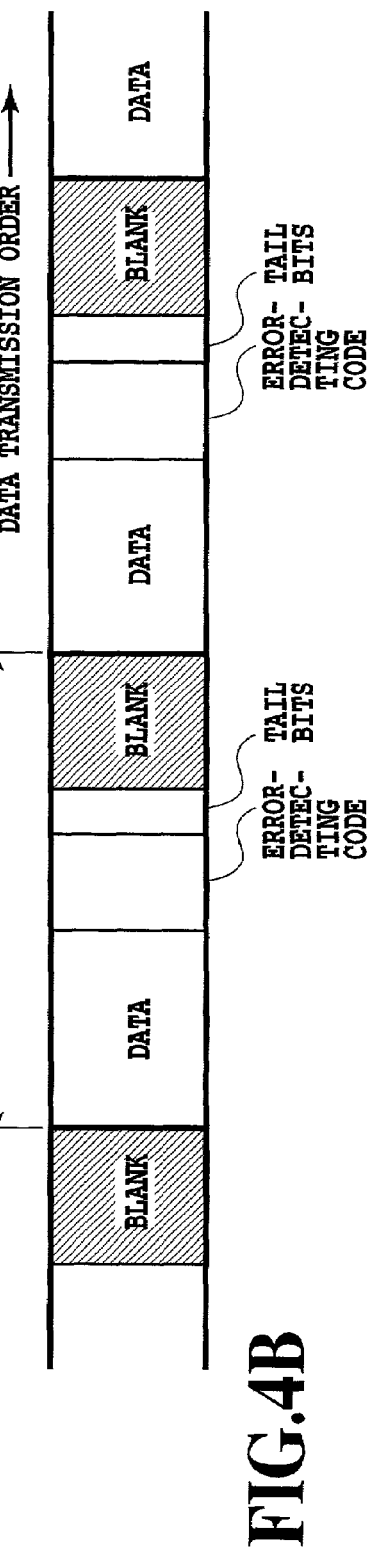

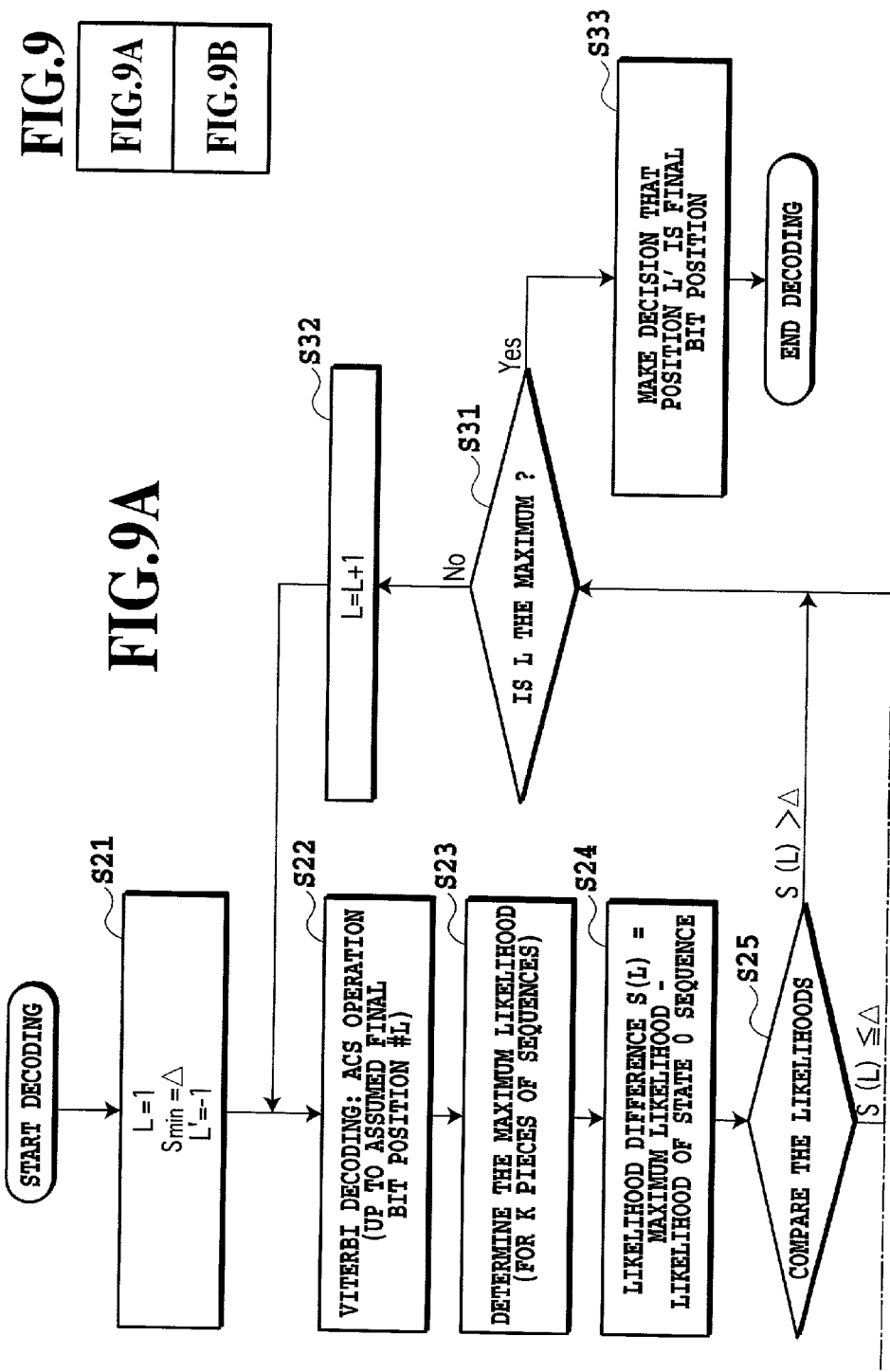

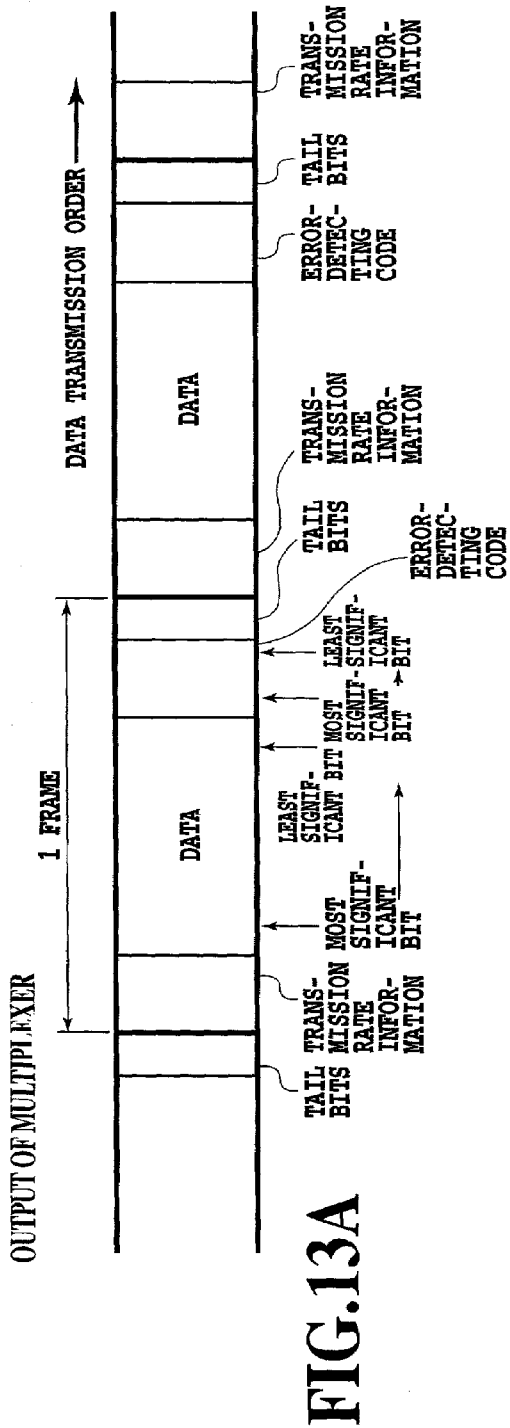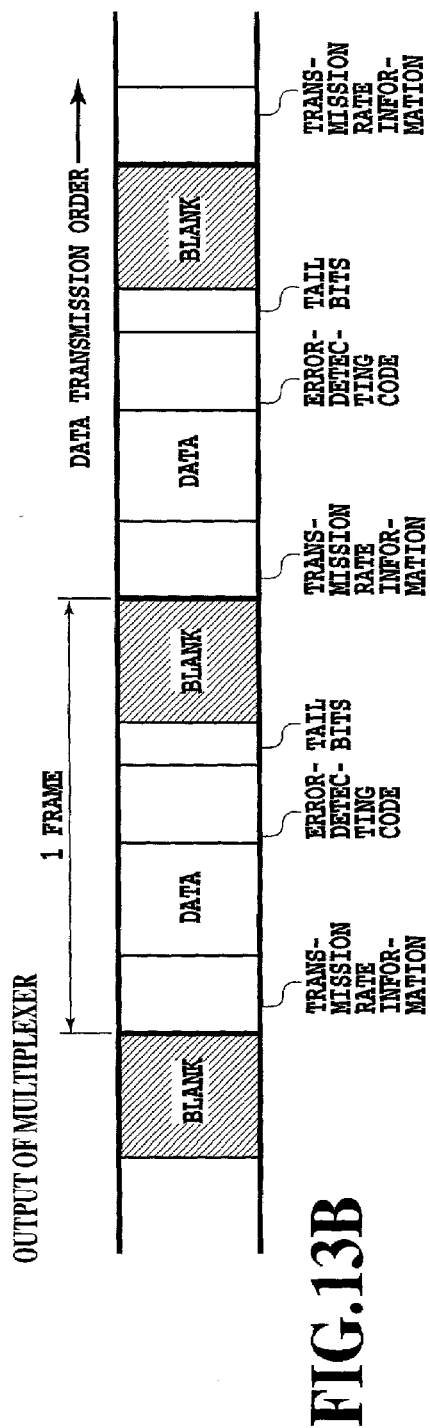

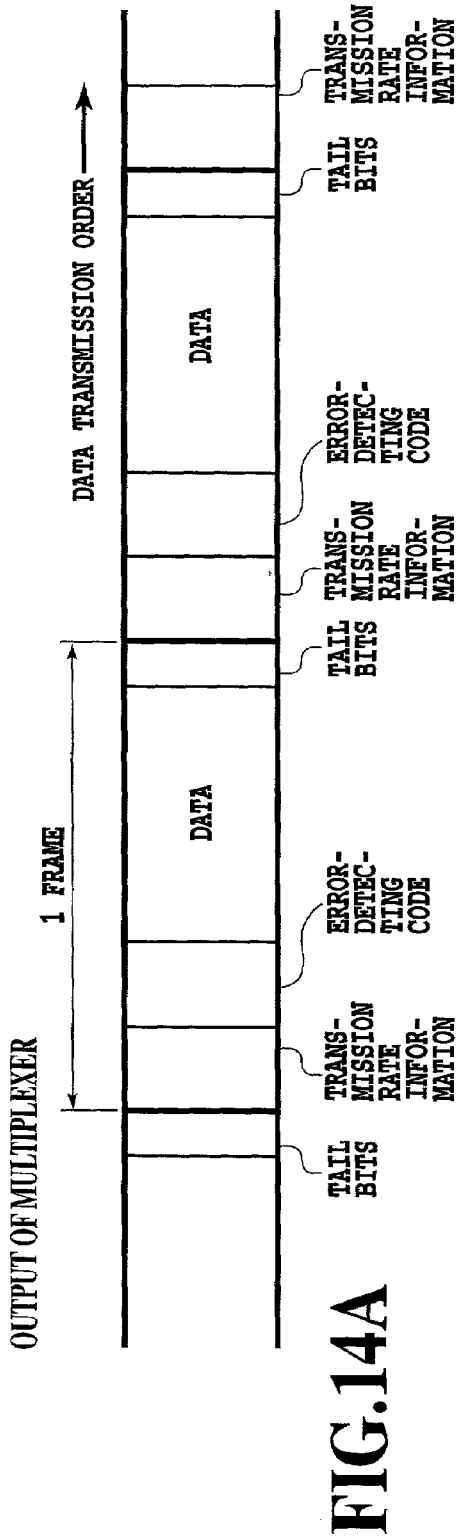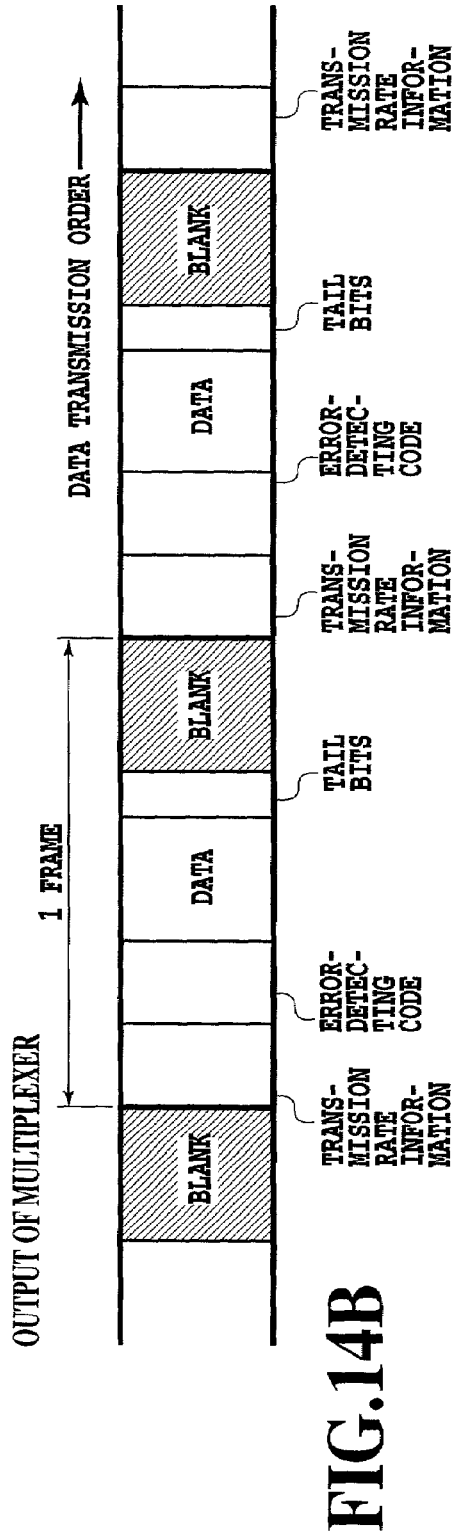

DATA TRANSMISSION METHOD, DATA TRANSMISSION SYSTEM, TRANSMITTER AND RECEIVER

This application claims priority under 35 U.S.C. 119 to Patent Application No. 2000-351884 filed Nov. 17, 2000 in Japan, the content of which is incorporated hereinto by reference.

BACKGROUND OF THE INVENTION

1. Field of the Invention

The present invention relates to a data transmission method, a data transmission system, a transmitter and a receiver where variable length transmission data is put into each frame of a fixed time length and transmitted.

2. Description of the Related Arts

In the data transmission method where information of voice signals and the like is converted into digital data and transmitted, an amount of information to be transmitted is not always constant in terms of time, but generally may change from time to time.

Accordingly, if the transmission data is divided into frame units each having a fixed time length and each frame consisting of variable number of bits is transmitted frame by frame to achieve the data transmission, a transmission rate can be varied temporally and necessary information can be transmitted efficiently in each frame period. At this time, a transmitter need not conduct useless transmission and hence the power consumption of the apparatus can be suppressed to low.

To conduct data transmission with varying transmission rate, normally it is necessary for the receiving side to get information indicating how fast the transmission rate of each frame is by means of some kind or another. For this purpose, conventionally there have been two methods: one is a method whereby the rate information is transmitted directly as part of frame data and the receiving side determines the rate on the basis of this information; and the other is a method where no rate information is sent, but the receiving side judges the rate with an error-detecting code that is added to the transmission data to indicate transmission quality (for example, CRC: Cyclic Redundancy Check code), called a blind rate detection method (for example, refer to International Publication No. WO96/26582 applied by the present applicant).

On the other hand, in communication environments where transmission errors occur frequently such as data transmission via a radio transmission path, it is commonly in practice to improve transmission quality by conducting error correction of the transmission data (FEC: Forward Error Correction). For error-correcting codes and error-correcting decoding, for example, a convolutional code and maximum likelihood decoding methods such as Viterbi decoding are used.

In addition, in the method where the receiving side determines the rate by using the error-detecting code that is added to the transmission data to indicate the transmission quality without sending any rate information, a decision error rate in determining the rate depends on a word length of the error-detecting code and doesn't decrease below a certain rate-decision error rate (namely, a probability of determining that no transmission error exists for an erroneous rate) even if the transmission error goes down.

On the other hand, in the case where the rate information is sent from the transmitting side to the receiving side, if an error occurs during transmission, an effective data length in the received frame cannot be judged and it becomes difficult for the receiving side to reproduce the transmission data correctly even if no error occurs in the data part.

Therefore, conventionally there has been devised a method whereby the rate-decision error rate was improved through the use of the likelihood information at the time of the maximum likelihood decoding and the transmission rate is allowed to vary, frame by frame, more securely during the transmission (for example, refer to International Publication No. WO97/50219 applied by the present applicant).

In the above-mentioned WO96/26582 and WO97/50219, described is a method where, in order to improve the rate detection performance at the receiving side (that is, to reduce the probability of detecting the rate mistakenly), CRC bits that have been conventionally added to the end of the transmission data (in this case the position of the CRC bits in the frame depends on the bit length of the transmission data) are arranged at a fixed position in the frame (for example, at the head of the frame) and transmitted.

FIGS. 1A and 1B are diagrams showing an example of transmission bit arrangement of the conventional scheme.

In the conventional method where the CRC bits are arranged after transmission data bits ("conventional postposition"), for example, when a position one bit ahead from the correct rate position is detected, since the codewords at the receiving side goes successively as D1 to D0 and C4 to C1, even if no transmission bit error occurs, the decision result by CRC shows OK (namely, erroneous detection) with a probability of 50 percent. Similarly to this, when a position two bits and three bits ahead from the correct rate position is detected, the decision result by CRC indicates OK erroneously with a probability of 25 percent and 12.5 percent, respectively.

To solve such a problem that the probability of detecting the rate mistakenly becomes larger as the assumed position approaches the correct rate position, there was devised a method where the CRC bits are arranged at the head of the frame in the above-mentioned WO96/26582 and WO97/50219. In this method, as shown in FIG. 1B ("preposition" case), since a codeword arrangement at the receiving side is discontinuous as D1, C4 to C1, the above-mentioned problem does not occur and a low probability of detecting the rate mistakenly that is determined by the word length of the CRC code can be obtained constantly, from a detection position adjacent to the correct position to a detection position remote therefrom.

However, in order that the transmitting side arranges the CRC bits always at the head of the frame, that is, ahead of the transmission data and transmits, it is essential to store temporarily the whole bits of the transmission data in memory until calculation of the error-detecting code for the transmission data is completed. Such buffer memory becomes large in size in proportion to the number of the transmission data bits of one frame, and when a huge amount of the transmission data is sent, hardware scale of the memory presents a problem.

To solve the problem, a method is disclosed in International Publication No. WO00/79720 in which an error-detecting code (CRC bits, for example) is provided after transmission data in such a way that the order of the error-detecting code bits is the reverse of that of the transmission data bits to transmit them.

FIGS. 2A and 2B are diagrams showing examples of the transmission bit arrangements of the conventional scheme and of the scheme according to the invention disclosed in WO00/79720. As can be understood from the figures, according to the arrangement of the invention disclosed in WO00/79720 ("new postposition"), since the codeword arrangement at the receiving side is discontinuous as D1, D0, C0, there does not occur a problem in that the probability of detecting the rate mistakenly increases as the detection position approaches the correct rate position and a low probability of detecting the rate mistakenly that is determined by the word length of the CRC code can be obtained constantly, from a detection position adjacent to the correct position to a detection position remote therefrom.

Moreover, since the bit arrangement according to the invention disclosed in WO00/79720 is such that CRC is arranged after the transmission data, it is not necessary to provide the buffer for temporarily storing the transmission data while maintaining the rate detection performance high as mentioned above and hardware can be implemented with a small circuit scale.

Furthermore, in the invention disclosed in WO00/79720, it is possible that, considering a case where the number of bits of the transmitted data becomes zero, if the number of bits of the transmitted data is zero at the transmitting side, the frame data is generated by considering the previously-specified bit pattern to be the error-detecting code. It is possible that at the receiving side, a position where the number of bits of the transmitted data becomes zero is also assumed as the final bit position of the frame data, and if the error-detecting code in the case of the assumption agrees with the above-mentioned previously-specified bit pattern, a decision that the position where the number of bits of the transmitted data becomes zero is the final bit position of the frame data is made.

In actual data transmissions, there is a case where the number of bits of the transmitted data to be sent becomes zero, for example, as a silent interval (namely, an interval when a sender does not speak) in the case of transmission of voice information, and it is preferable that the receiving side conducts the rate detection correctly for various cases including a case like this (that is, a case where apparent transmission rate=0) (this is because at the receiving side a decoder of voice codec (CODEC) may recognize such an interval as a silent interval and conduct processing different from that of non-silent intervals, such as generation of a background noise).

For the previously-specified bit pattern, for example, bits equivalent to the parity bits of the error-detecting code (because of absence of the data, bits corresponding to an initial state of the error-detecting coder; for example, bits all consisting of zeros) may be used. If the number of bits of the transmitted data is zero, the transmitting side transmits the bits equivalent to the parity bits of the error-detecting code,(because of absence of the data, only these bits equivalent to the parity bits are error-correcting coded and transmitted). At the receiving side, the rate detection is conducted for candidate final bit positions including the final bit position when the number of data bits is equal to zero (the error detection at this occasion does not necessitate calculating the error-detecting code for the received data —re-encoding—, and all that is needed is only to compare the received parity-bit equivalent bits with the previously-specified bit pattern). Incidentally, if the bits equivalent to the parity bits of the error-detecting code is used as the previously-specified bit pattern, the need for additionally providing a circuit for generating the previously-specified bit pattern can be eliminated.

Although the circuit can be used in common by equalizing the length of the bit pattern with that of the parity bits of the error-detecting code (or CRC) that is given when the number of the other data bits is not zero, the length may be different as the need arises.

For the bit pattern, it is necessary to specify previously at least one kind of a pattern, but it may be possible that a plurality of patterns are specified and one of these is used in combination with other purpose (each of various control information is transmitted being mapped with each bit pattern).

According to the invention disclosed in WO00/79720, however, it is required that an error-detecting code (CRC bits, for example) be always provided even if there is no data to achieve adequate performance during blind rate detection or rate information itself be transmitted, even in a channel such as a control signal transmission channel that is inappropriate for being used as the reference of an outer loop transmission power control (this is a part of a dual closed loop transmission power control that is combined with an inner loop transmission power control, for maintaining and controlling block or frame error rate quality), that is, a channel that requires no frame (block) error rate calculation.

Overhead required to provide the CRC bits also in a period during which no data exists decreases transmission efficiency considerably in the case where information is transmitted intermittently like a control signal transmission channel.

SUMMARY OF THE INVENTION

Therefore, it is an object of the present invention to achieve a high-quality variable rate data transmission based on high-precision rate detection while reducing overhead in accordance with the concept of blind rate detection in which rate information is not transmitted.

To achieve the object, in the first aspect of the present invention, there is provided a data transmission method for placing variable-length transmission data in each frame having a fixed time length to transmit the frame, comprising the steps of: at a transmitting side, calculating an error-detecting code of the transmission data in the frame only if the frame contains the transmission data; generating frame data containing the transmission data and the calculated error-detecting code of the transmission data if the frame contains the transmission data, and generating frame data that contains neither the transmission data nor the error-detecting code of the transmission data if the frame does not contain the transmission data; and transmitting the generated frame data; and at a receiving side, receiving the frame data; determining the transmission data and the error-detecting code of the transmission data by determining a predetermined position in the received frame data as the final bit position of the frame data, and calculating an error-detecting code based on the determined transmission data; deciding that the frame contains the transmission data if the determined error-detecting code matches the error-detecting code calculated based on the determined transmission data, and deciding that the frame data does not contain the transmission data or the received frame data contains an error if the determined error-detecting code does not match the calculated error-detecting code; and obtaining the transmission data in the frame based on the result of the decision.

In the second aspect of the present invention, there is provided a data transmission method for placing variable-length transmission data in each frame having a fixed time length to transmit the frame, comprising the steps of: at a transmitting side, calculating an error-detecting code of the transmission data in the frame only if the frame contains the transmission data; generating frame data containing the transmission data and the calculated error-detecting code of the transmission data if the frame contains the transmission data, and generating frame data that contains neither the transmission data nor the error-detecting code of the transmission data if the frame does not contain the transmission data; and transmitting the generated frame data; and at a receiving side, receiving the frame data; assuming the transmission data and the error-detecting code of the transmission data by assuming one or more final bit positions of the received frame data, and calculating an error-detecting code based on the assumed transmission data; deciding a position to be the final bit position of the frame data if there is the position in the frame where the assumed error-detecting code matches the error-detecting code calculated based on the assumed transmission data among the assumed final bit positions of the frame data, and deciding that the frame does not contain the transmission data or the received frame data contains an error if there is no position where the assumed error-detecting code matches the calculated error-detecting code; and obtaining the transmission data in the frame based on the result of the decision.

Here, at the transmitting side, the step of generating the frame data may generate the frame data in which the error-detecting code is placed after the corresponding transmission data and the bits of the error-detecting code are arranged in the order that is the reverse of the order of the bits of the transmission data.

Here, the data transmission method may further comprise: at the transmitting side, conducting error-correcting coding of the generated frame data; and conducting interleaving of the frame data that has undergone the error-correcting coding; and at the receiving side, conducting deinterleaving of the received frame data; and conducting error-correcting decoding of the frame data that has undergone the deinterleaving.

Here, at the transmitting side, the data transmission method may further comprise the step of calculating transmission rate information indicating the number of bits of the transmission data in each frame, and the step of generating the frame data generates the frame data containing the calculated transmission rate information.

Here, if the frame contains the transmission data, the length of the transmission data may be within the range from 1 to X bits, the length of the error-detecting code associated with the transmission data may be Y bits, and the combination of X and Y may be one of (X, Y)=(8, 8), (244, 12), (4080, 16), and (1048576, 24).

Here, the data transmission method may multiplex variable-length transmission data for channels in a first channel group of one or more channels and transmission data for channels in a second channel group of one or more channels into each frame having a fixed time length to transmit the frame, and at the transmitting side, the step of calculating the error-detecting code may calculate the error-detecting code of the transmission data for each channel in the first channel group only if the frame contains the transmission data for the channel; the step of generating the frame data may generate, for each channel in the first channel group, partial frame data containing the transmission data for the channel and the calculated error-detecting code of the transmission data for the channel if the frame contains the transmission data for the channel, and may generate, for each channel in the first channel group, partial frame data containing neither the transmission data for the channel nor the error-detecting code of the transmission data for the channel if the frame does not contains the transmission data for the channel; and the step of transmitting the frame data may transmit the whole frame data containing the generated partial frame data for each channel in the first channel group, and at the receiving side, the step of receiving the frame data may receive the whole frame data; the step of calculating the error-detecting code may determine the transmission data for each channel in the first channel group and the error-detecting code of the transmission data for the channel by determining a predetermined position in the partial frame data for the channel contained in the received whole frame data as the final bit position and calculates an error-detecting code based on the decided transmission data for the channel; the step of deciding may decide, for each channel in the first channel group, that the partial frame data for the channel contains the transmission data for the channel if the determined error-detecting code of the determined transmission data for the channel matches the error-detecting code calculated based on the determined transmission data for the channel, and may decide, for each channel in the first channel group, that the frame does not contain the transmission data for the channel or the partial frame data for the channel contains an error if the determined error-detecting code of the determined transmission data for the channel does not match the error-detecting code calculated based on the determined transmission data for the channel; and the step of obtaining the transmission data may obtain the transmission data for each channel in the first channel group in the frame based on the result of the decision.

Here, the data transmission method may multiplex variable-length transmission data for channels in a first channel group of one or more channels and transmission data for channels in a second channel group of one or more channels into each frame having a fixed time length to transmit the frame, and at the transmitting side, the step of calculating the error-detecting code may calculate the error-detecting code of the transmission data for each channel in the first channel group only if the frame contains the transmission data for the channel; the step of generating the frame data may generate, for each channel in the first channel group, partial frame data containing the transmission data for the channel and the calculated error-detecting code of the transmission data for the channel if the frame contains the transmission data for the channel, and may generate, for each channel in the first channel group, partial frame data containing neither the transmission data for the channel nor the error-detecting code of the transmission data for the channel if the frame does not contains the transmission data for the channel; and the step of transmitting the frame data may transmit the whole frame data containing the generated partial frame data for each channel in the first channel group, and at the receiving side, the step of receiving the frame data may receives the whole frame data; the step of calculating the error-detecting code may assume the transmission data for each channel in the first channel group and the error-detecting code of the transmission data for the channel by assuming one or more final bit positions of the partial frame data for the channel contained in the received whole frame data and calculates an error-detecting code based on the assumed transmission data for the channel; the step of deciding may decide, for each channel in the first channel group, a position to be the final bit position of the partial frame data for the channel if there is the position where the assumed error-detecting code of the transmission data for the channel matches the error-detecting code calculated based on the assumed transmission data for the channel among the assumed final bit positions of the partial frame data for the channel, and may decide, for each channel in the first channel group, that the frame does not contain the transmission data for the channel or the partial frame data for the channel contains an error if there is no position where the assumed error-detecting code of the transmission data for the channel matches the error-detecting code calculated based on the assumed transmission data for the channel among the assumed final bit positions of the partial frame data for the channel; and the step of obtaining the transmission data may obtain the transmission data for each channel in the first channel group in the frame based on the result of the decision.

Here, dual closed loop transmission power control comprising inner loop transmission power control and outer loop transmission power control may be performed for the data transmission between the transmitting side and the receiving side and one or more channels in the second channel group may be used as the reference for the outer loop transmission power control without using channels in the first channel group as the reference.

Here, the relative ratio between error-correcting coding ratios of the multiplexed channels and the relative ratio between transmission powers for the multiplexed channels may be fixed.

In the third aspect of the present invention, there is provided a data transmission system for placing variable-length transmission data in each frame having a fixed time length to transmit the frame, comprising: in a transmitter, means for calculating an error-detecting code of the transmission data in the frame only if the frame contains the transmission data; means for generating frame data containing the transmission data and the calculated error-detecting code of the transmission data if the frame contains the transmission data, and generating frame data that contains neither the transmission data nor the error-detecting code of the transmission data if the frame does not contain the transmission data; and means for transmitting the generated frame data; and in a receiver, means for receiving the frame data; means for determining the transmission data and the error-detecting code of the transmission data by determining a predetermined position in the received frame data as the final bit position of the frame data, and calculating an error-detecting code based on the determined transmission data; means for deciding that the frame contains the transmission data if the determined error-detecting code matches the error-detecting code calculated based on the determined transmission data, and deciding that the frame data does not contain the transmission data or the received data contains an error if the determined error-detecting code does not match the calculated error-detecting code; and means for obtaining the transmission data in the frame based on the result of the decision.

In the fourth aspect of the present invention, there is provided a data transmission system for placing variable-length transmission data in each frame having a fixed time length to transmit the frame, comprising: in a transmitter, means for calculating an error-detecting code of the transmission data in the frame only if the frame contains the transmission data; means for generating frame data containing the transmission data and the calculated error-detecting code of the transmission data if the frame contains the transmission data, and generating frame data that contains neither the transmission data nor the error-detecting code of the transmission data if the frame does not contain the transmission data; and means for transmitting the generated frame data; and in a receiver, means for receiving the frame data, means for assuming the transmission data and the error-detecting code of the transmission data by assuming one or more final bit positions of the received frame data, and calculating an error-detecting code based on the assumed transmission data; means for deciding a position to be the final bit position of the frame data if there is the position in the frame where the assumed error-detecting code matches the error-detecting code calculated based on the assumed transmission data among the assumed final bit positions of the frame data, and deciding that the frame does not contain the transmission data or the received frame data contains an error if there is no position where the assumed error-detecting code matches the calculated error-detecting code; and means for obtaining the transmission data in the frame based on the result of the decision.

In the fifth aspect of the present invention, there is provided a transmitter for placing variable-length transmission data in each frame having a fixed time length to transmit the frame, comprising: means for calculating an error-detecting code of the transmission data in the frame only if the frame contains the transmission data; means for generating frame data containing the transmission data and the calculated error-detecting code of the transmission data if the frame contains the transmission data, and generating frame data that contains neither the transmission data nor the error-detecting code of the transmission data if the frame does not contain the transmission data; and means for transmitting the generated frame data.

In the sixth aspect of the present invention, there is provided a receiver for receiving, for each frame having a fixed length, frame data containing transmission data and an error-detecting code calculated for the transmission data if the frame contains the transmission data, and receiving, for each frame having the fixed length, frame data containing neither the transmission data nor the error-detecting code of the transmission data if the frame does not contain the transmission data, the receiver comprising: means for receiving the frame data; means for determining the transmission data and the error-detecting code of the transmission data by determining a predetermined position in the received frame data as the final bit position of the frame data, and calculating an error-detecting code based on the decided transmission data; means for deciding that the frame contains the transmission data if the determined error-detecting code matches the error-detecting code calculated based on the decided transmission data, and deciding that the frame data does not contain the transmission data or the received frame data contains an error if the determined error-detecting code does not match the calculated error-detecting code; and means for obtaining the transmission data in the frame based on the result of the decision.

In the seventh aspect of the present invention, there is provided a receiver for receiving, for each frame having a fixed length, frame data containing transmission data and an error-detecting code calculated for the transmission data if the frame contains the transmission data, and receiving, for each frame having the fixed length, frame data containing neither the transmission data nor the error-detecting code of the transmission data if the frame does not contain the transmission data, the receiver comprising: means for receiving the frame data; means for assuming the transmission data and the error-detecting code of the transmission data by assuming one or more final bit positions of the received frame data, and calculating an error-detecting code based on the assumed transmission data; means for deciding a position to be the final bit position of the frame data if there is the position in the frame where the assumed error-detecting code matches the error-detecting code calculated based on the assumed transmission data among the assumed final bit positions of the frame data, and deciding that the frame does not contain the transmission data or the received frame data contains an error if there is no position where the assumed error-detecting code matches the calculated error-detecting code; and means for obtaining the transmission data in the frame based on the result of the decision.

According to the above-described configuration, high-quality variable rate data transmission can be achieved based on high-precision rate detection while reducing overhead in accordance with the concept of blind rate detection in which rate information is not transmitted.

The above and other objects, effects, features and advantages of the present invention will become more apparent from the following description of embodiments thereof taken in conjunction with the accompanying drawings.

BRIEF DESCRIPTION OF THE DRAWINGS

FIGS. 1A and 1B are diagrams showing example of transmission bit arrangements of the conventional scheme;

FIGS. 2A and 2B are diagrams showing example of the transmission bit arrangement of the conventional scheme and of the transmission bit arrangement according to the present invention;

FIGS. 4A, 4B and 4C are diagrams showing examples of frame configurations of the transmission data in the first embodiment according to the present invention;

FIG. 9 is a diagram showing relationship between FIGS. 9A and 9B;

FIGS. 9A and 9B are flowcharts of another processing example of rate decision in the first embodiment according to the present invention;

FIGS. 13A, 13B and 13C are diagrams showing examples of the frame configurations of the transmission data in the case of the "postposition and same order");

FIGS. 14A, 14B and 14C are diagrams showing examples of the frame configuration of the transmission data in the case of the "preposition";

DETAILED DESCRIPTION OF PREFERRED EMBODIMENT

Hereafter, preferred embodiments to implement the present invention will be described in detail with reference to the drawings.

(First Embodiment)

Figure 3A:
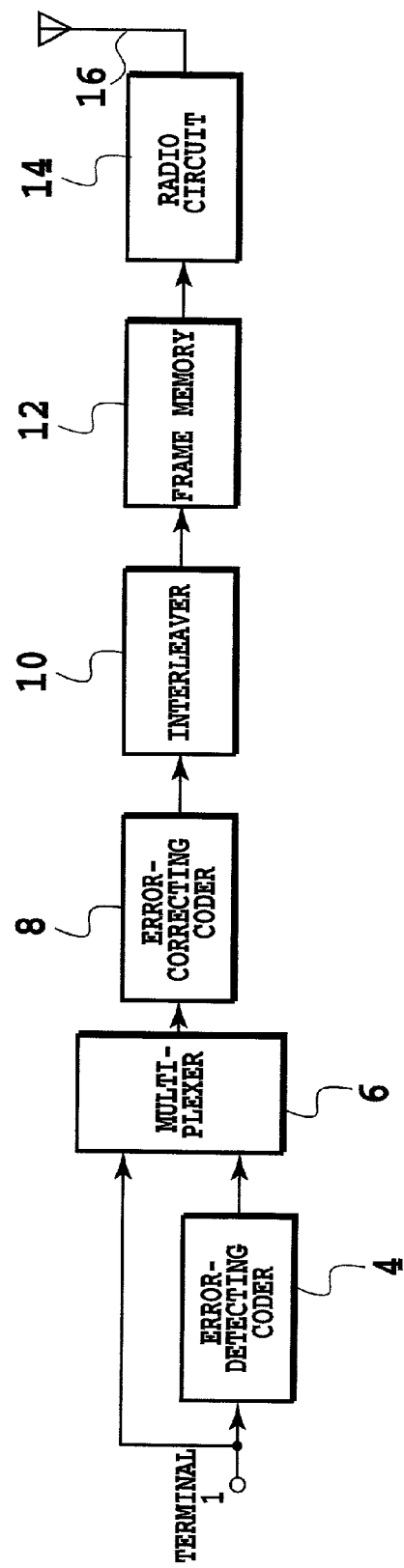
FIGS. 3A and 3B are block diagrams showing examples of configurations of a transmitter and a receiver in a first embodiment according to the present invention.
Figure 3B:
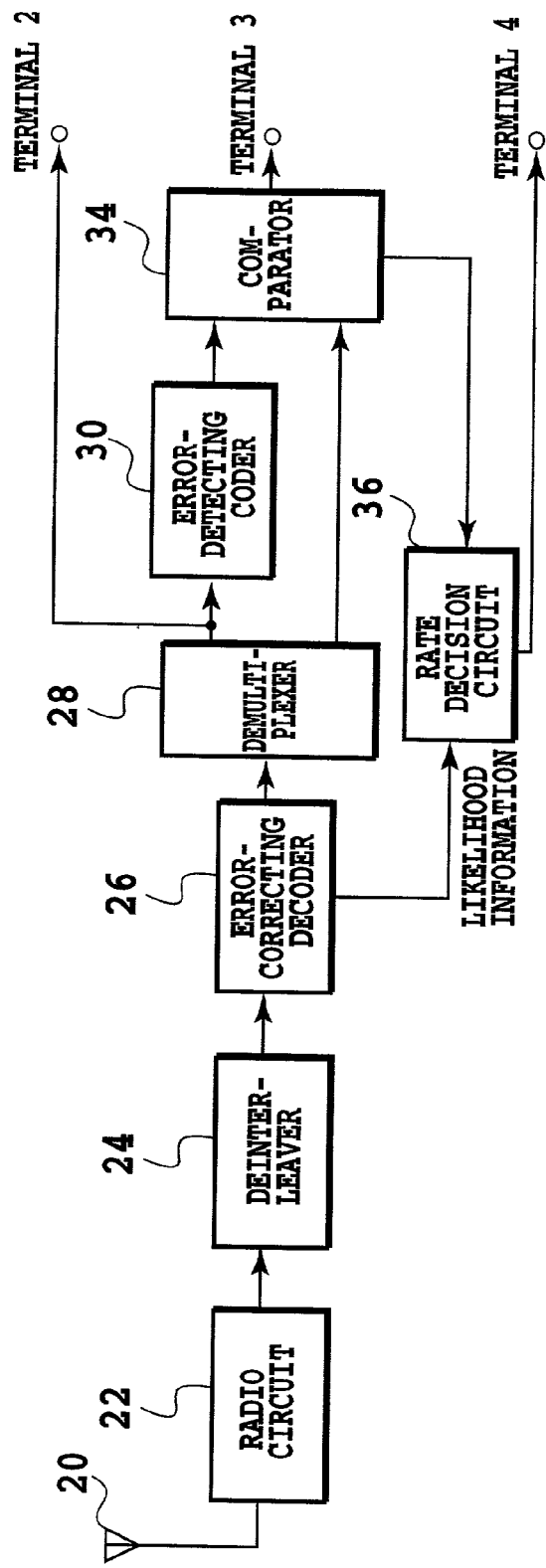

FIGS. 3A and 3B show examples of block constructs of a transmitter and a receiver in a first embodiment of the present invention.

In FIGS. 3A and 3B, a transmission data sequence applied to a terminal 1 is sent both to an error-detecting coder 4 and a multiplexer 6. The error-detecting coder 4 calculates an error-detecting code (CRC parity bits (CRC bits) in this embodiment) for one frame of transmission data only if the frame contains the transmission data. In this embodiment, the word length of the CRC bits is a fixed length.

In this embodiment, the sum of the length of the transmission data and the length of the error-detection code (CRC bits) in one frame is 4096 bits maximum. The length of the error-detecting code is 16 bits. Thus, the length of the transmission data is 0 (when there is no data) or a value in the range from 1 to 4080 bits. According to this embodiment, the error-detecting code is not sent when there is no transmission data to reduce overhead and the length of the error-detecting code is increased correspondingly, thereby enabling higher-precision rate detection (that is, high-quality variable rate transmission). Other values may be set as the maximum length of the transmission data and length of the error-detecting code. For example, the maximum length of the transmission data may be 8, 244, or 1048576 bits and the length of the corresponding error-detecting code may be 8, 12, or 24 bits, respectively.

Then, the multiplexer 6 arranges the error-detecting code (CRC bits) calculated by the error-detecting coder 4 after the transmission data if the frame contains the transmission data. Here, the bits of the error-detecting code are arranged in the opposite (reverse) order to the transmission data. In this embodiment, the error-detecting coder 4 outputs the error-detecting code bites in the opposite order to normal output.

In this embodiment, to conduct the error-correcting coding with a convolutional code, the multiplexer 6 further adds tail bit(s) that will be necessary for the error-correcting decoding to the transmission data and the error-detecting code and outputs them sequentially frame by frame. The tail bit may be added by an error-correcting coder 8.

The multiplexer 6 outputs no transmission data, error-detecting code, nor tail bit if the frame contains no transmission data.

Figure 4C:
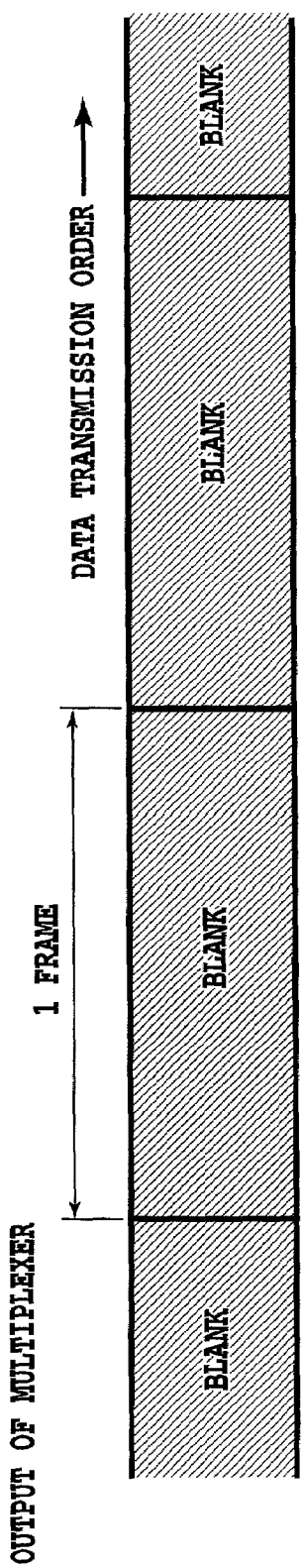

FIGS. 4A, 4B and 4C shows examples of the data sequence outputted from the multiplexer 6. FIG. 4A shows the case where the transmission rate of the transmission data (simply indicated as "data" in FIGS. 4A and 4B) is the maximum and FIGS. 4B and 4C show the case where the transmission rate is below the maximum rate. When transmission is conducted at a transmission rate below the maximum rate, a blank time period (time period without data) is produced in the frame. FIGS. 4A and 4B show frames containing transmission data and FIG. 4C shows a frame without transmission data. The length of the transmission data placed in each frame varies with time and therefore the data sequence outputted from the multiplexer 6 will be as shown in FIG. 4A in a time period, as shown in FIG. 4B in another period, and as shown in FIG. 4C in yet another period, for example.

The data sequence outputted from the multiplexer 6 undergoes convolutional coding in the error-correcting coder 8 and sent to an interleaver 10 for interleaving. The convolutional coding is not conducted if the frame contains no transmission data.

Figure 5:
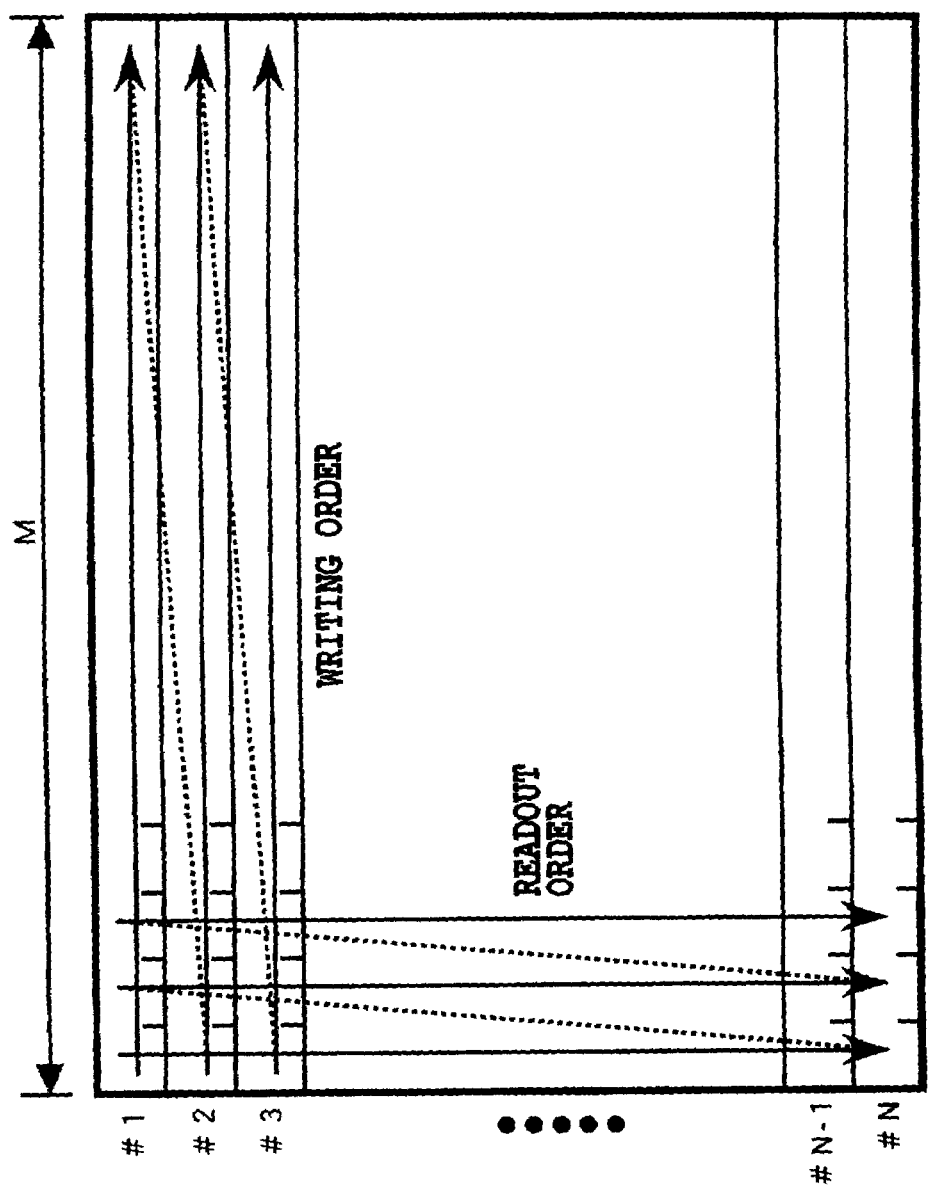
FIG. 5 is a diagram illustrating a processing example of an interleaver in the first embodiment according to the present invention.

FIG. 5 shows an example of the interleaving by the interleaver 10. The data sequence of one frame is outputted in a direction different from a direction in which the data is inputted, that is, the transmission data inputted in a line direction is outputted in a column direction. Incidentally, as for another example of the interleaving, the interleaving processing described in Japanese Patent Application No. 11-129056 applied by the present applicant can be enumerated. The data sequence outputted from the interleaver 10 is written into s frame memory 12.

Figure 6:
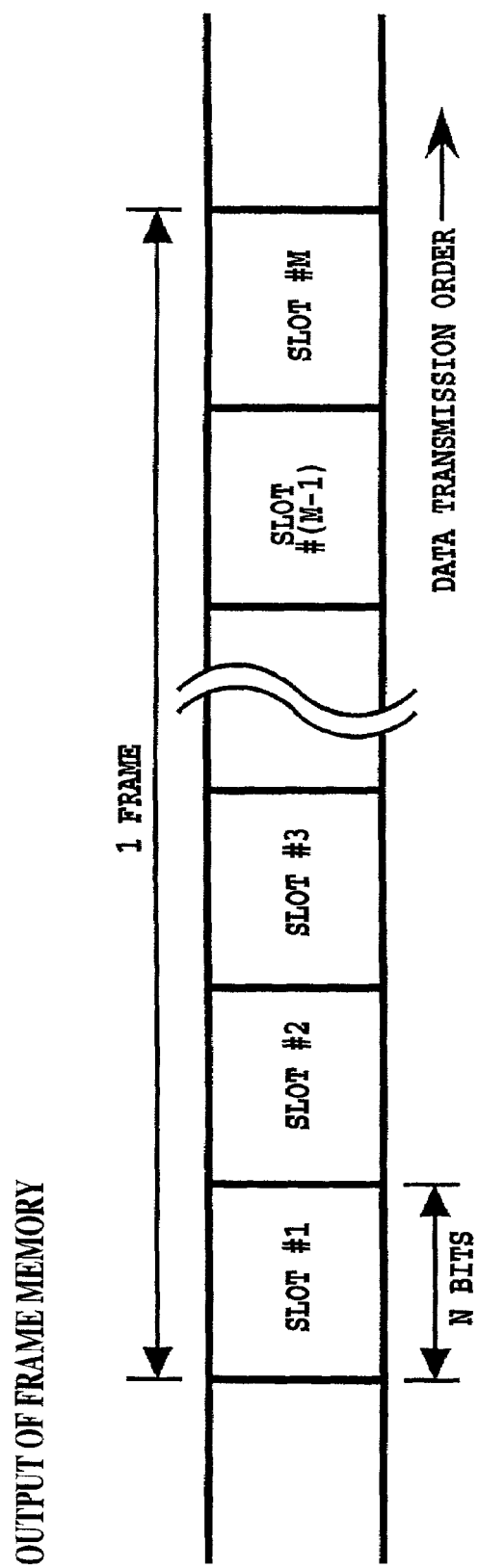
FIG. 6 is a diagram showing an example of a frame configuration of the transmission data in the first embodiment according to the present invention.

FIG. 6 shows an example of the frame configuration of the data sequence obtained from the frame memory 12. The data interval corresponding to the column of the interleaver 10 is called a slot, and here it is assumed that one slot is composed of N bits and one frame is composed of M slots. The number of bits of one frame becomes N×M bits.

The output data sequence of the frame memory 12 is modulated by a radio circuit 14 and transmitted through an antenna 16. Here, for modulation schemes, for example, a spread spectrum modulation scheme, a QPSK modulation scheme, etc. are used. In addition, it is specified that no modulation is conducted at a data position corresponding to blank data in the slot. According to the foregoing, the data consisting of variable number of bits is made to be transmitted in a constant frame time.

Next, in the receiver, the received signals fed from an antenna 20 is demodulated by a radio circuit 22 and then inputted into a deinterleaver 24 sequentially. The deinterleaver 24 has a memory in it and conducts the interleaving in such a procedure that inputting into and outputting from the interleaver 10 at the transmitting side are reversed, that is, writing the data into the memory for each column (each slot) and reading the data for each line. Through such operations as these, an original data sequence of one frame is reproduced and the coded transmission data sequence and the error-detecting code are revealed. The interleaving and the deinterleaving mentioned just above are intended to enhance an error correction effect even further by preventing burst errors as detected in consecutive data bits.

The deinterleaved data sequence is sent to an error-correcting decoder 26 and undergoes the error-correcting decoding by the maximum likelihood decoding method, and the decoded data sequence is separated into the error-detecting code and the data sequence by a demultiplexer 28, and the error-detecting code is inputted into a comparator 34.

On the other hand, the data sequence is outputted from a terminal 2 as received data and at the same time inputted into an error-detecting coder 30. At the error-detecting coder 30, the inputted data sequence undergoes the same error-detecting coding as that of the transmitter again. The error-detecting code obtained by re-coding is compared with the error-detecting code so separated, code-bit by code-bit, by the comparator 34, and if all the code bits are found to agree with each other, a coincidence signal is outputted. In addition, since the error-correcting code bits in the received frame are in a reverse order to the normal case, the error-detecting coder 30 in this embodiment outputs the error-correcting code bits in a reverse order to the normal case.

Here, the error-correcting decoding and the calculation of the error-detecting code are conducted, frame by frame, by successively assuming the final bit position of transmittable frame data. At this occasion, the error-correcting decoder 26 sends likelihood information for a decoding result up to each of the assumed final bit positions to a rate decision circuit 36, and the rate decision circuit 36 decides the final bit position, namely, the transmission rate of the frame on the basis of this likelihood information and the coincidence signal of the error-detecting codes.

Figure 7:
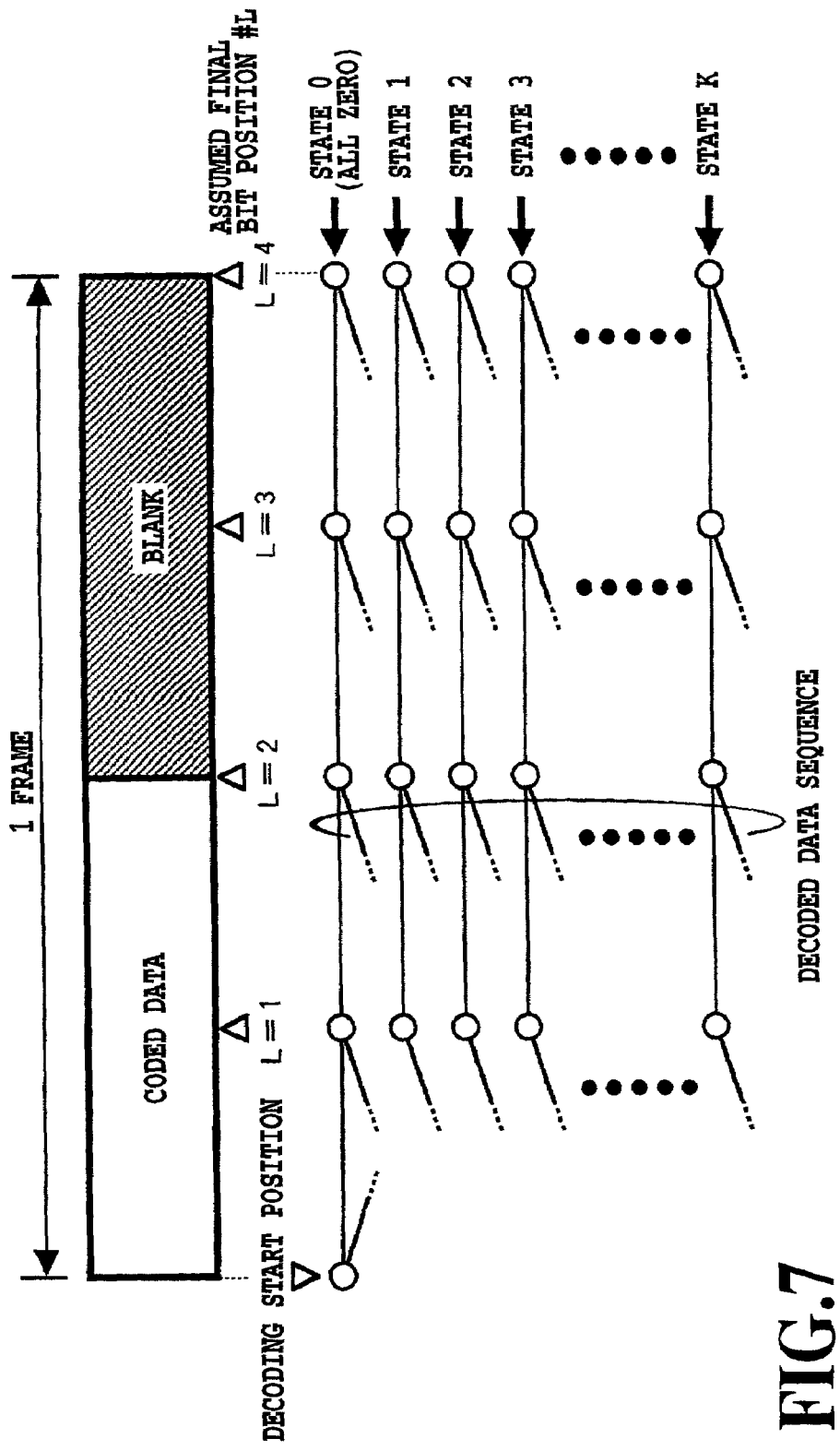
FIG. 7 is a diagram showing an example of a decoded data sequence at the time of the maximum likelihood decoding in the first embodiment according to the present invention.
Figure 8:
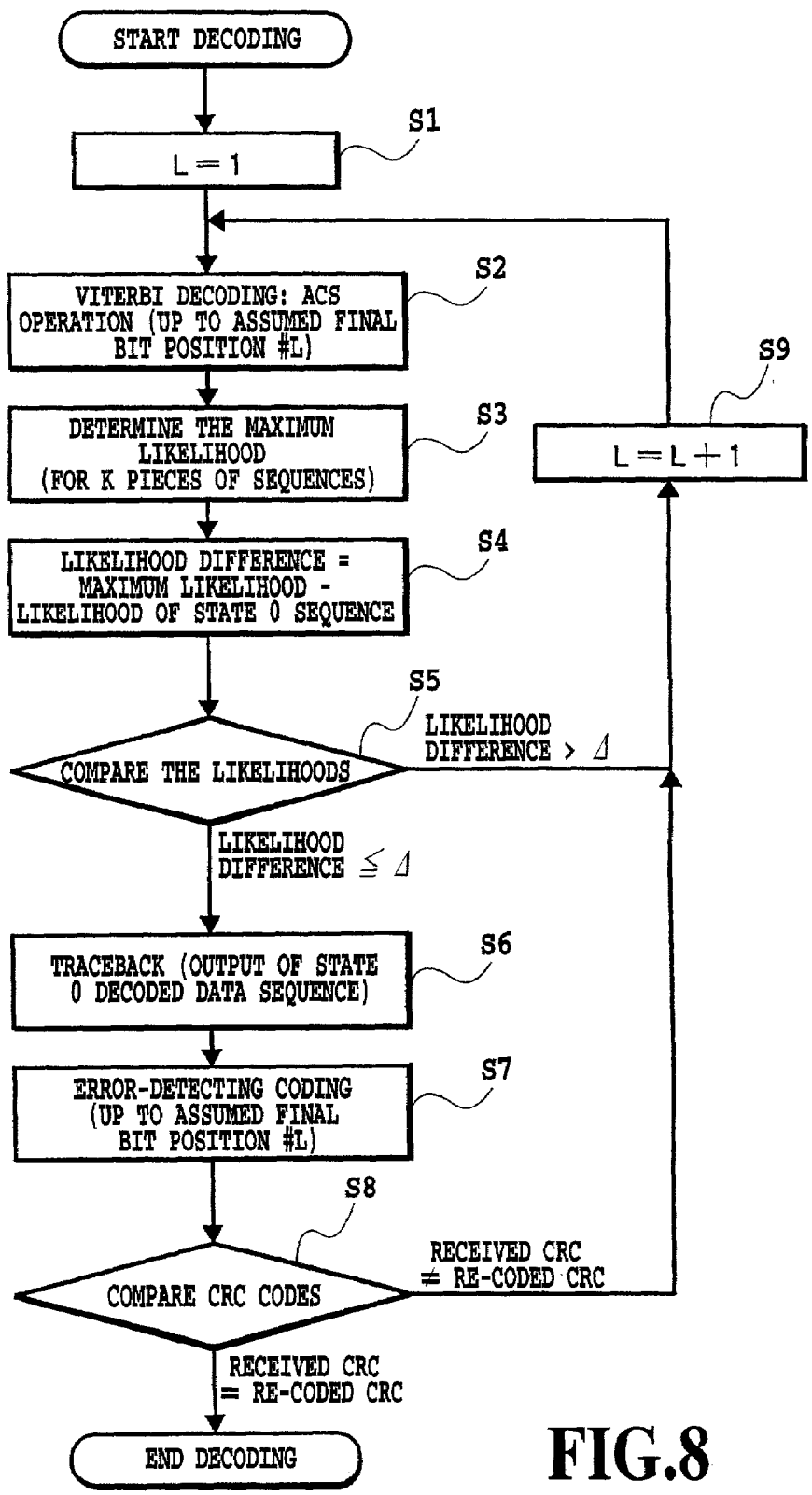
FIG. 8 is a flowchart of a processing example of rate decision in the first embodiment according to the present invention.

FIG. 7 shows an example of the decoded data sequence at the time of the maximum likelihood decoding, and FIG. 8 shows an example of the processing of rate decision (algorithm). Here, for the maximum likelihood decoding, Viterbi decoding is assumed.

First, after Viterbi decoding starts, regarding a plurality of decoded data sequences each of which still remains in each state (in the example of FIG. 7, K pieces of the decoded data sequences that reach the states 1 to K) at the assumed final bit position (in the example of FIGS. 7 and 8, the position #L), the likelihoods with respect to the transmission data sequence of those are obtained, respectively, and a difference between the maximum value of these likelihood and a likelihood with respect to the transmission data sequence of the decoded data sequence (in the example of FIG. 7, the data sequence that reaches the state 0) obtained by terminating the decoding process is obtained (steps S1 to S4).

If this likelihood difference is within a certain range (in the example of FIG. 8, within Δ), the selected decoded data sequence is outputted by traceback and the error-detecting coding (CRC coding) is conducted (steps S5 and S6).

Since in this embodiment the word length of the CRC code is a fixed length and a frame configuration that the transmission data is arranged just ahead of the CRC code is adopted, (assumed) transmission data (part) and the (assumed) error-detecting code (part) for the assumed final bit position can be obtained. That is, by assuming the final bit position, the transmission data (part) and the error-detecting code (part) are concomitantly assumed. Then, the obtained (assumed) transmission data undergoes the error-detecting (re-)coding (CRC coding).

If this re-coded CRC agrees with the received CRC ((assumed) error-detecting code), the decoding is ended and the transmission data is acquired (restored) by deciding that the assumed final bit position is the final bit position of the transmission frame data. Since the bit arrangements of the transmission data in the frame and of the error-detecting code are in a reverse order to each other, the probability that a comparison result of CRCs indicates coincidence erroneously is extremely small.

If the likelihood difference exceeds Δ or the comparison result of CRCs indicates no coincidence, a next position is assumed and Viterbi decoding is continued. In addition, if there are detected a plurality of positions where the likelihood difference is within Δ and the comparison result of the error-detecting codes indicates coincidence when Viterbi decoding and the calculation of the error-detecting code are conducted for the assumed final bit positions, a decision that a position where the likelihood difference becomes the minimum is the final bit position of the transmission frame data may be made. This will be described later.

In the example of FIG. 7, if no error occurs on the way of transmission, it is reasonable to think as follows: a sequence that reaches the state 0 at the second position (L=2) has the maximum likelihood (likelihood difference=0) and the comparison result of the error-detecting codes for this decoded sequence indicates coincidence.

On the other hand, if an error or errors occurs on the may of transmission, a sequence that reaches the state 0 does not necessarily have the maximum likelihood. Accordingly, by setting Δ to an appropriate value, the same effect of reduction in the rate-decision error rate as that in the case of no transmission error can be obtained also for the decoded sequence such that occurred errors have been corrected. In a region where the value of Δ is not more than a certain value, by setting Δ to a smaller value, an average rate-decision error rate can be lowered further; an average frame error rate (the probability that the comparison result of CRCs indicates no coincidence+the rate-decision error rate) becomes larger.

Therefore, for example, for data that requires an extremely low rate-decision error rate, such as control data, it is better to make Δ smaller at the cost of the frame error rate to some degree.

Alternatively, considering tendency of the errors that occur during the transmission with respect to Δ, the difference between the maximum and the minimum of the likelihoods obtained at respective assumed final bit positions is regarded as a factor and a constant value multiplied by this factor may be set as Δ.

If the re-coded CRC does not match the received CRC at all the assumed final bit positions, it is decided that there is no transmission data or the received frame data contains an error.

When data transmission is conducted using the transmitter and the receiver of such configurations as in the foregoing, even if the receiving side varies the number of bits in the frame (namely, apparent transmission rate) without sending any information indicating the number of transmission bits in the frame from the receiving side, the receiving side can receive the data.

In addition, this scheme makes it possible both, at the receiving side, to lower the probability of detecting the rate mistakenly during transmitting the variable rate data, and at the transmitting side, to eliminate the need for providing buffer for temporarily storing the transmission data.

Furthermore, by adopting the rate decision method that uses jointly the likelihood information during Viterbi decoding, it is possible to lower the possibility of outputting the transmission data of an erroneous length in the frame on the basis of the erroneous decision result of the rate, and thus a highly-reliabile variable rate data transmission can be conducted.

Because the error-detecting code is not transmitted for a frame without transmission data, overhead can be reduced.

As described above, if there are detected a plurality of positions where the likelihood difference is within Δ and the comparison result of the error-detecting codes indicates coincidence when Viterbi decoding and the calculation of the error-detecting code are conducted for the assumed final bit positions, a decision that a position where the likelihood difference becomes the minimum is the final bit position of the transmission frame data may be made.

Figure 9B:
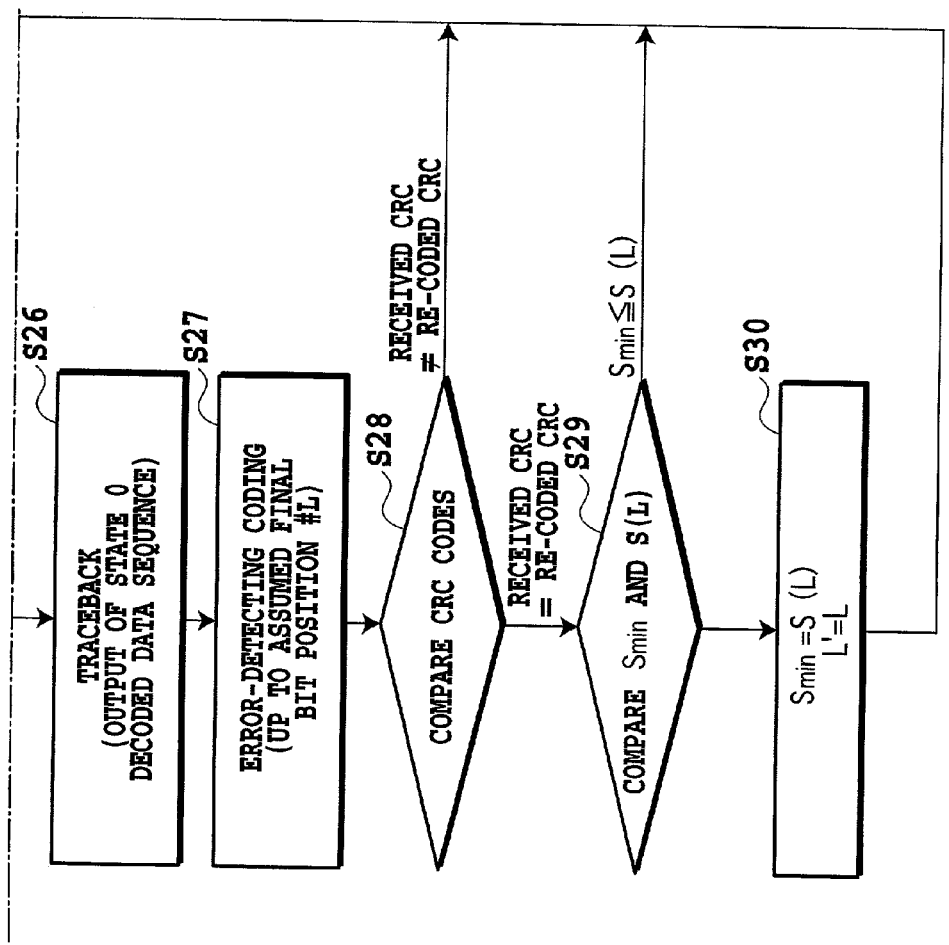

FIGS. 9A and 9B show another example of the processing of rate decision (algorithm). In the example of FIGS. 9A and 9B, —representing the assumed bit position as L—an assumed first position (L=1) through an assumed final position (at step S31, whether or not the assumed final position has been checked is judged) are thoroughly checked and then a decision that a position where the likelihood difference is the minimum is the final bit position is made. In this occasion, a variable $S_{min}$ for storing the minimum likelihood difference and a variable L' for storing its position are used.

However, it is conceivable that there is a case where the likelihood difference is within Δ and not a single position where the comparison result of the error-detecting codes indicates coincidence is detected. Since in that case, even at the stage of step S33, L' satisfies L'=−1 (a value that was set at step S21), it is decided that there is no transmission data or the received frame data contains an error. In addition, if the value of Δ is set to infinity, a situation that not a single position where the likelihood difference is within Δ is detected can be avoided.

In this embodiment, the error-correcting coding is conducted with a convolutional code, but the error-correcting coding may be done by means of other method, for example, one with a turbo code. Furthermore, as the above-mentioned WO97/50219, the frame data may be divided into a plurality of blocks and each block may undergo the error-correcting coding with a block code.

Moreover, in this embodiment, the frame data undergoes the error-correcting coding and the interleaving as well as the deinterleaving and the error-correcting decoding. However, without these operations, it is possible that the probability of detecting the rate mistakenly in the variable rate data transmission is suppressed to low and that the need for providing buffer for temporarily storing the transmission data is eliminated. In that case, all that is needed is that among the assumed final bit positions of the assumed frame data, a position where the assumed error-detecting code agrees with an error-detecting code calculated on the basis of the assumed transmission data is simply decided to be the final bit position of the frame data, without using the likelihood information.

If it is known that the length of transmission data is one of two values, X (X≠0) and 0, then the process on the receiving side can be further simplified. That is, it is not required that every final bit positions be successively assumed in each frame. Instead, the transmission data (length: X) and the error-correcting code are determined based on the final bit position determined with respect to the length, X, of the transmission data and the error-detecting code of the determined transmission data is calculated. If the determined error-detecting code matches the calculated error-detecting code based on the determined transmission data, it is decided that there is transmission data. Otherwise, it is decided that there is not transmission data or the received frame data contains an error.

(Second Embodiment)

Figure 10A:
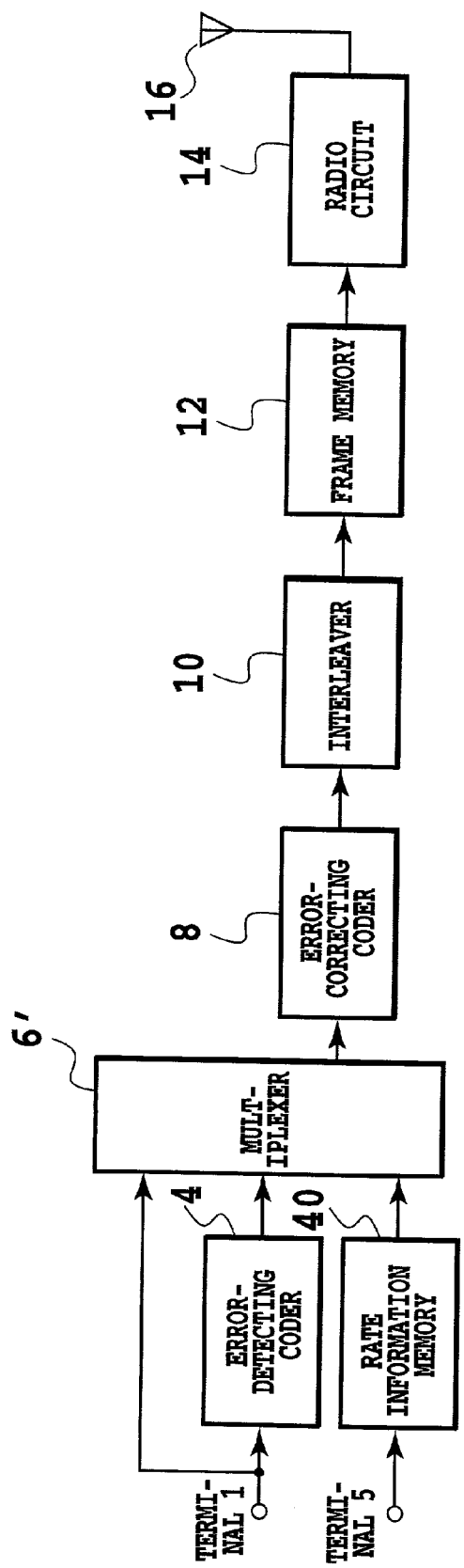
FIGS. 10A and 10B are block diagrams showing examples of the configurations of the transmitter and the receiver in a second embodiment according to the present invention.
Figure 10B:
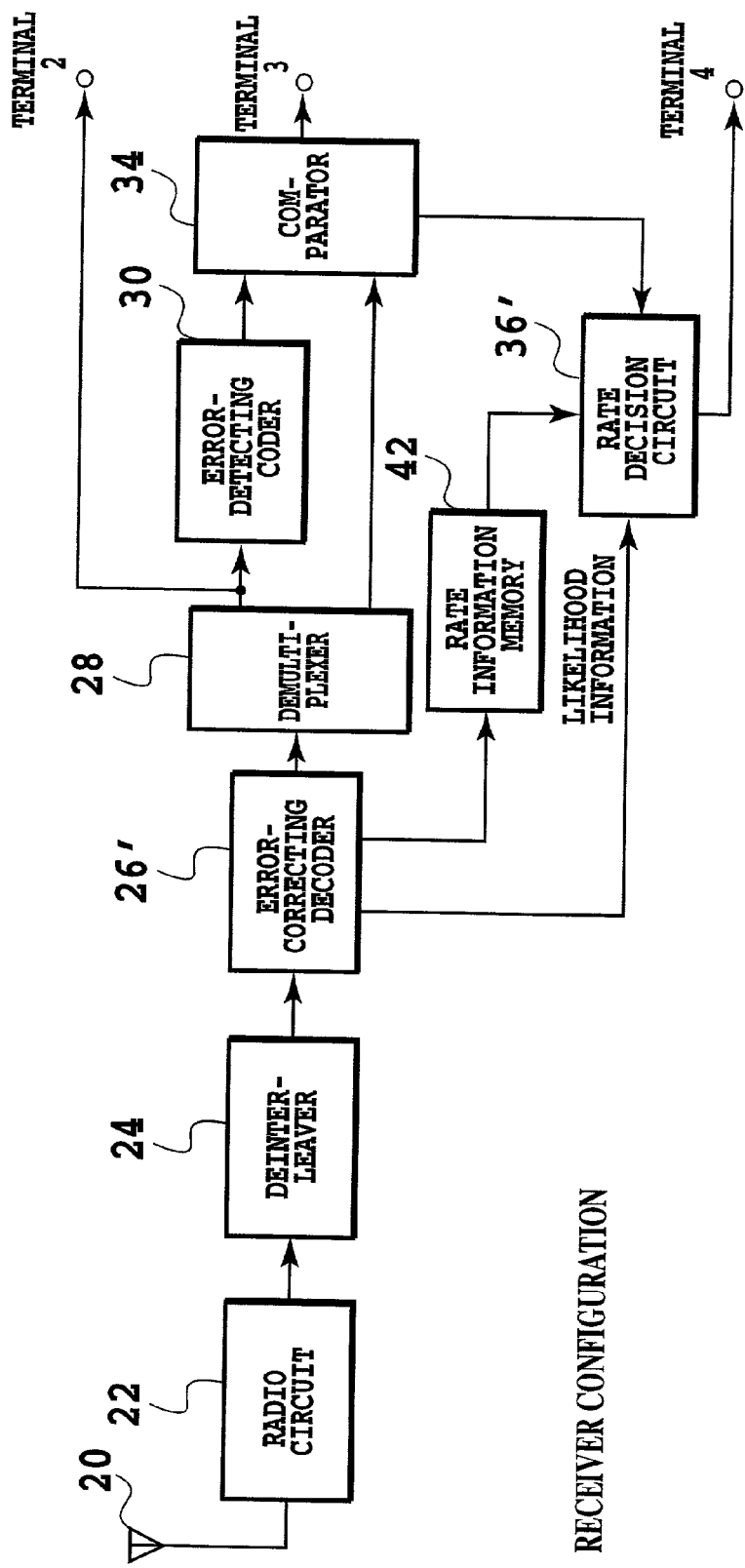

FIGS. 10A and 10B show examples of the block constructs of a transmitter and a receiver in a second embodiment according to the present invention.

In the configuration of FIGS. 10A and 10B, transmission of information indicating the rate of the transmission data is added to the configuration of FIGS. 3A and 3B, and the receiving side uses this rate information additionally to make the rate decision. In FIGS. 10A and 10B, all the parts common to those of the configurations of FIGS. 3A and 3B are denoted by the same numerals. Description of operations will be given below, focusing on parts different from those of FIGS. 3A and 3B.

First, information (transmission rate information) indicating the transmission rate of the transmission data applied to terminal 5 is sent to rate information memory 40. Here, the contents of the rate information memory 40 are rate information about the transmission data, namely, the number of bits. A multiplexer 6' outputs the following information successively frame by frame: information indicating the rate of the transmission data red from the rate information memory 40; the transmission data sent from terminal 1, an error-detecting code calculated for the transmission data in error-detecting coder 4; and the tail bits. The multiplexer 6' outputs neither the transmission data, error-detecting code, nor tail bit if a frame contains no transmission data, instead, it outputs only the transmission rate information. Also in this embodiment, the error-detecting code is arranged after the transmission data and the bits of the error-detecting code are arranged in the opposite order to the transmission data. In this embodiment, the transmission rate information is provided at the head of the frame.

Also in this embodiment, the sum of the length of the transmission data and the length of the error-detection code (CRC bits) in one frame is 4096 bits maximum. The length of the error-detecting code is 16 bits. Other values may be set as the maximum length of the transmission data and length of the error-detecting code.

Figure 11A:
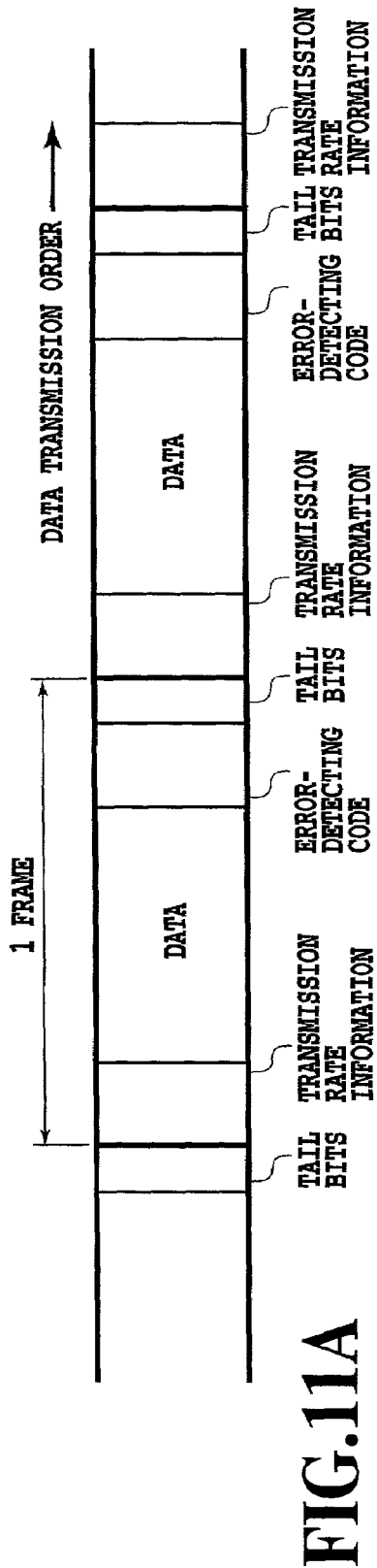
FIGS. 11A, 11B and 11C are diagrams showing examples of the frame configurations of the transmission data in the second embodiment according to the present invention.
Figure 11B:
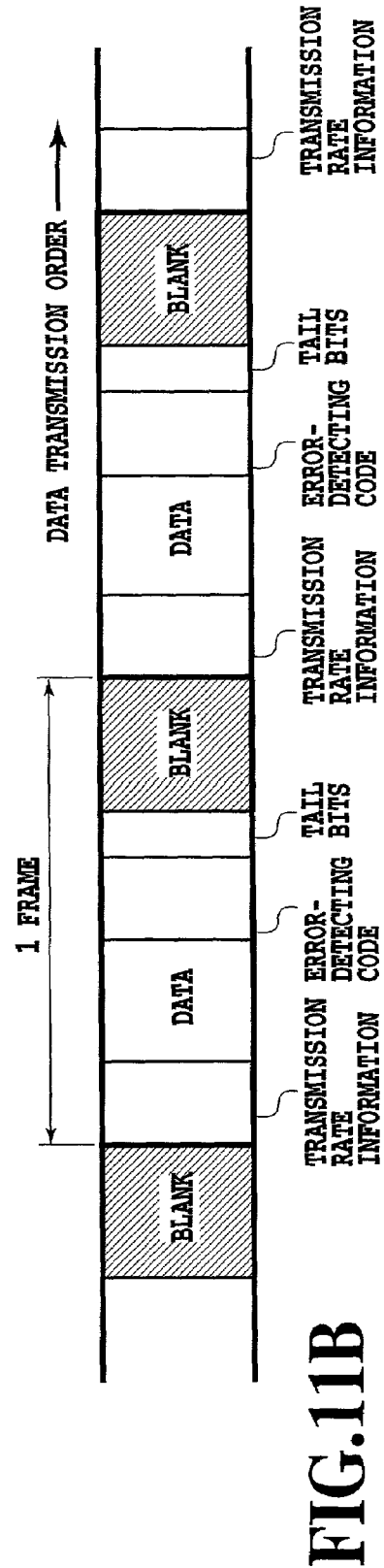
Figure 11C:
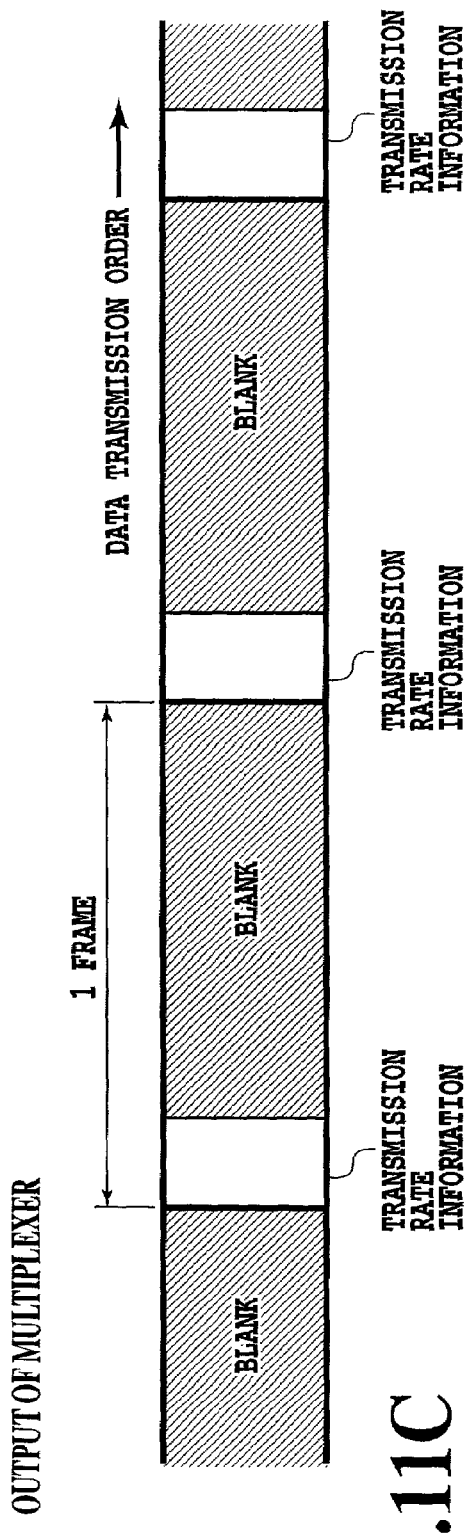

FIGS. 11A, 11B and 11C show examples of the data sequence output from the multiplexer 6'. FIG. 11A shows the case where the transmission rate of the transmission data is the maximum, 11B shows the case where the transmission rate is below the maximum rate and there is transmission data, and FIG. 11C shows the case where there is no transmission data.

In this embodiment, the error-correcting coder 8 conducts the error-correcting coding with a block code for the transmission rate information (as examples of concrete error-correcting codes, one may enumerate a double orthogonal code, Reed-Muller code, BCH code, etc. or alternatively error-correcting coding other than the error-correcting coding with a block code may be used), and does the error-correcting coding with a convolutional code for the transmission data, the error-detecting code, and the tail bits. Furthermore, the interleaver 10 conducts the interleaving of these data that have undergone the error-correcting coding, either independently for each data or collectively. In addition, in the error-correcting coder 8, all of the transmission rate information, the transmission data, the error-detecting code, and the tail bits may undergo collectively the error-correcting coding with a convolutional code.

On the other hand, in the receiver, if the transmission rate information undergoes the error-correcting coding with a block code or the like independently from the transmission data or the like, the transmission rate information part undergoes the error-correcting decoding properly in an error-correcting decoder 26' and subsequently the decoding result is retained in a rate information memory 42. On the contrary, if the transmission rate information, the transmission data, etc. undergo convolutional-coding collectively, in the error-correcting decoder 26' the decoding result of the rate information bits part arranged at the head of the frame is temporarily obtained by interrupting sequential Viterbi decoding that has been started from the head of the frame, and this decoding result is retained in the rate information memory 42.

Figure 12:
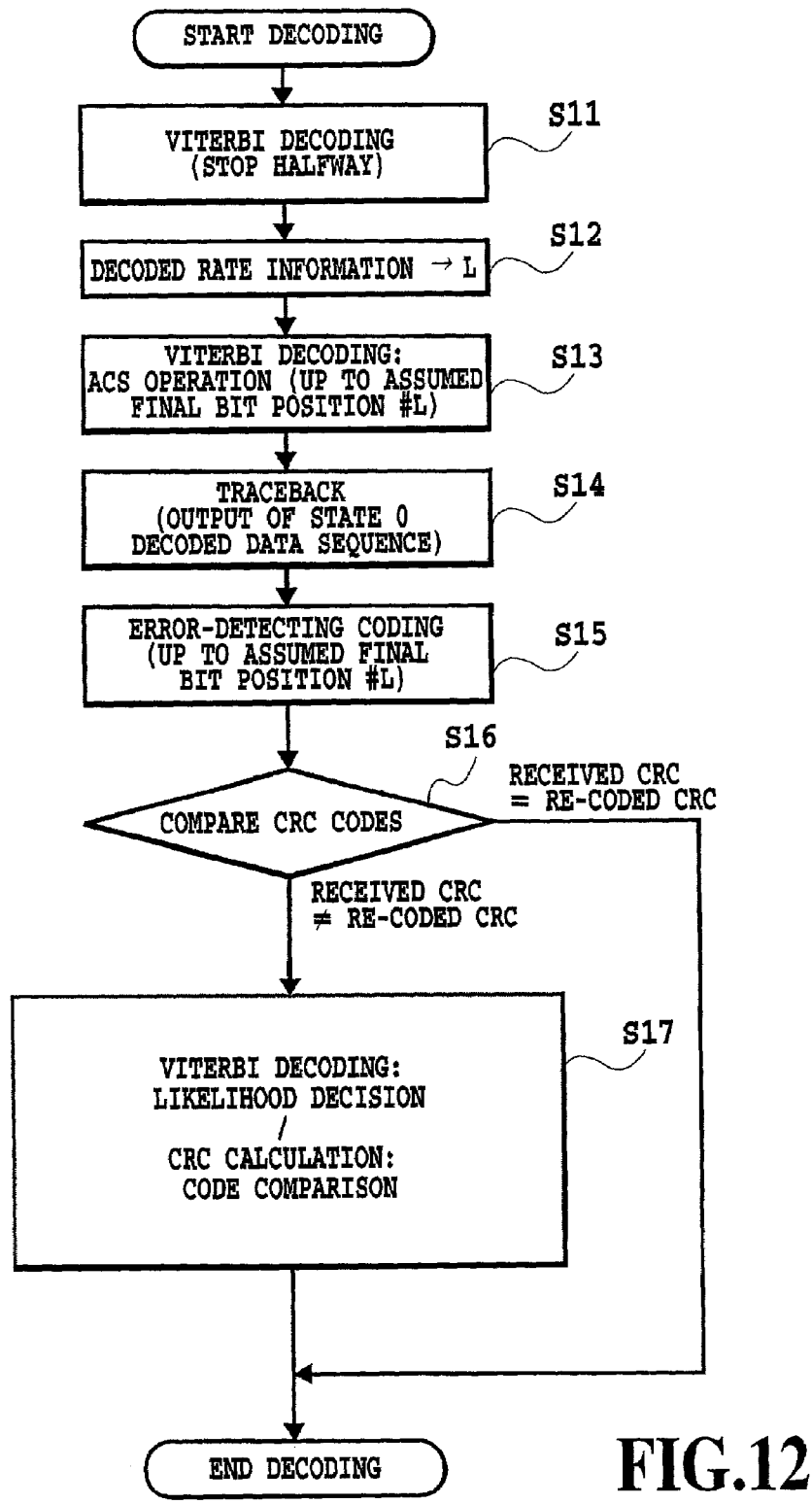
FIG. 12 is a flowchart of a processing example of rate decision in the second embodiment according to the present invention.

FIG. 12 shows the rate decision processing (algorithm) in the receiver of this embodiment. The error-correcting decoder 26' assumes a position indicated by the contents of the rate information memory 42 as the final bit position, continues to conduct Viterbi decoding of the frame data up to that position, outputs the decoded data sequence obtained by terminating the decoding process through traceback, and conducts the error-detecting coding (CRC coding) (steps S11 to S15).

If the re-coded CRC agrees with the received CRC the decoding process is completed (step S16), a decision that the position indicated by the contents of the rate information memory is the final bit position of the transmission frame data is made and the transmission data is acquired (restored). Since the bit arrangements of the transmission data in the frame and of the error-detecting code are set in a reverse order to each other, the probability that the comparison result of CRCs indicates coincidence erroneously is extremely small.

In this embodiment, if the comparison result of CRCs indicates no coincidence, the final position of the transmittable frame data other than the final bit position indicated by the contents of the rate information memory is assumed successively, the error-correcting decoding and the calculation of the error-detecting code are conducted, and the rate decision is made using the likelihood information during Viterbi decoding and the comparison result of the error-detecting codes (the same processing as step S17 and steps S1 to S8 of FIG. 8).

Also, between steps S13 and S14, similarly to the first embodiment, the following steps may be added: determining the maximum likelihood (step S3); finding the likelihood difference (step S4); and judging whether or not the likelihood difference is within a certain range (step S5). Concrete processes may be as follows: if the likelihood difference is within a certain range, the flow is made to proceed to step S14; if the likelihood difference is not within a certain range, the flow is made to proceed to step S17. In the case where such processing (steps S3 to S5) is conducted, although the number of processes increase as compared to when such processing is not done, the rate-decision error rate can be improved further. In addition, $\Delta$ used at step S5 between step S13 and step S14 and $\Delta$ used at step S5 while being in step S17 may be the same value or may be different values.

If the re-coded CRC does not match the received CRC at all the assumed final bit positions, it is decided that there is no transmission data or the received frame data contains an error.

Also in the case where the transmitter and the receiver of the foregoing configurations are used to conduct the data transmission, it is possible that the probability of detecting the rate mistakenly at the receiving side during transmitting variable rate data is suppressed to low and that the need for providing buffer for temporarily storing the transmission data at the transmitting side is eliminated.

Moreover, if there is no transmission error, the rate information is surely detected by the receiver; on the other hand, supposing that the rate information is transmitted erroneously, the rate decision is made possible through the use of likelihood information during Viterbi decoding and the comparison result of the error-detecting codes, so that the final frame error rate is improved and a low rate-decision error rate is achieved. By this means, the highly-reliabile variable rate data transmission can be performed.

Because the error-detecting code is not transmitted for a frame without transmission data, overhead can be reduced.

In addition, since the reliability of Viterbi decoding result of the rate information bit part can be made larger as the input signal stored in the decoder, namely, the length of the subsequent coded data sequence becomes longer in the foregoing description, it is preferable that the data sequences of a fixed length other than the transmission data, such as the error-detecting code, are arranged just after the rate information bits successively as much as possible.

Alternatively, it may be also possible that in the transmitter the tail bits are inserted after the rate information bits, and in the receiver the decoding operation is temporarily completed at this tail bits, and after the received rate information is obtained, the decoding operation is re-started to decode the frame data up to the final bit.

Also in this embodiment, if it is known that the length of transmission data is one of two values, X (X≠0) and 0, then the process on the receiving side can be further simplified. That is, if the rate information indicates a transmission data length of 0 at step S12 in FIG. 12, it is determined that there is no transmission data, and then the process ends. If the rate information indicates a transmission data length of X, the process at step S13 and the subsequent steps is performed, and if the received CRC matches the re-coded CRC at step S16, it is decided that there is transmission data, otherwise, it is decided that there is no transmission data or the received frame data contains an error.

Alternatively, even if the rate information indicates a transmission data length of Y (Y≠0, Y≠X) (in such a case, the rate information is wrong), the transmission data and error-detecting code (received CRC) may be determined based on the final bit position determined on the assumption that the length of the transmission data is X, the error-detecting code (re-coded CRC) of the determined transmission data may be calculated, and if the received CRC matches the re-coded CRC, it may be decided that there is transmission data, otherwise it is decided that there is no transmission data or the received frame data contains an error.

Moreover, even if the rate information indicates at transmission data length of Y=0, the transmission data and error-detecting code (received CRC) may be determined based on the final bit position determined on the assumption that the length of the transmission data is X, the error-detecting code (re-coded CRC) of the determined transmission data may be calculated, and if the received CRC matches the re-coded CRC, it may be decided that there is transmission data, otherwise, it is decided that there is no transmission data or the received frame data contains an error.

In the first and second embodiments, it is possible that in judging (at the receiving side) whether or not the likelihood difference is within the predetermined range (step S5 in FIG. 8), the predetermined range (the value of Δ in FIG. 8) is varied (is made different) according to the assumed final bit position of the frame data.

When the present invention is applied in actual radio communication environments, a proper value of Δ to obtain the desired detection performance may differ for each of the final bit positions (that is, different number of bits of the transmitted data in the frame) depending on the tendency of the transmission bit errors in the transmission path. In such cases, if a single value of Δ is used in common, the rate detection performance differs according to the final bit position. Consequently, there arises a problem in that when a percentage of transmission frequencies of the transmission rates (final bit positions) vary, the average quality of the variable rate data transmission including the rate detection performance changes.

Then, it is conceivable that the value of Δ for the decision of the threshold value is set to not a single value but several different values (Δ1, Δ2, ... ΔL, ..., ΔN) for respective final bit positions (respective transmission rates) and thereby the decision of the rate is made possible. Here, a value of each ΔL may be varied during the transmission so as to be always an optimum value in response to the change in the transmission environment. Furthermore, the same value may be used in part repeatedly.

(Third Embodiment)

Transmission data for a plurality of channels can be multiplexed into (contained in) each frame and the data transmission method described with respect to the first or second embodiment can be applied to only (variable-length data of) some of the channels. For example, if a channel for transmitting a control signal is included in the channels to be multiplexed, the method of the first or second embodiment may be applied to only the control signal transmission channel.

Figure 16:
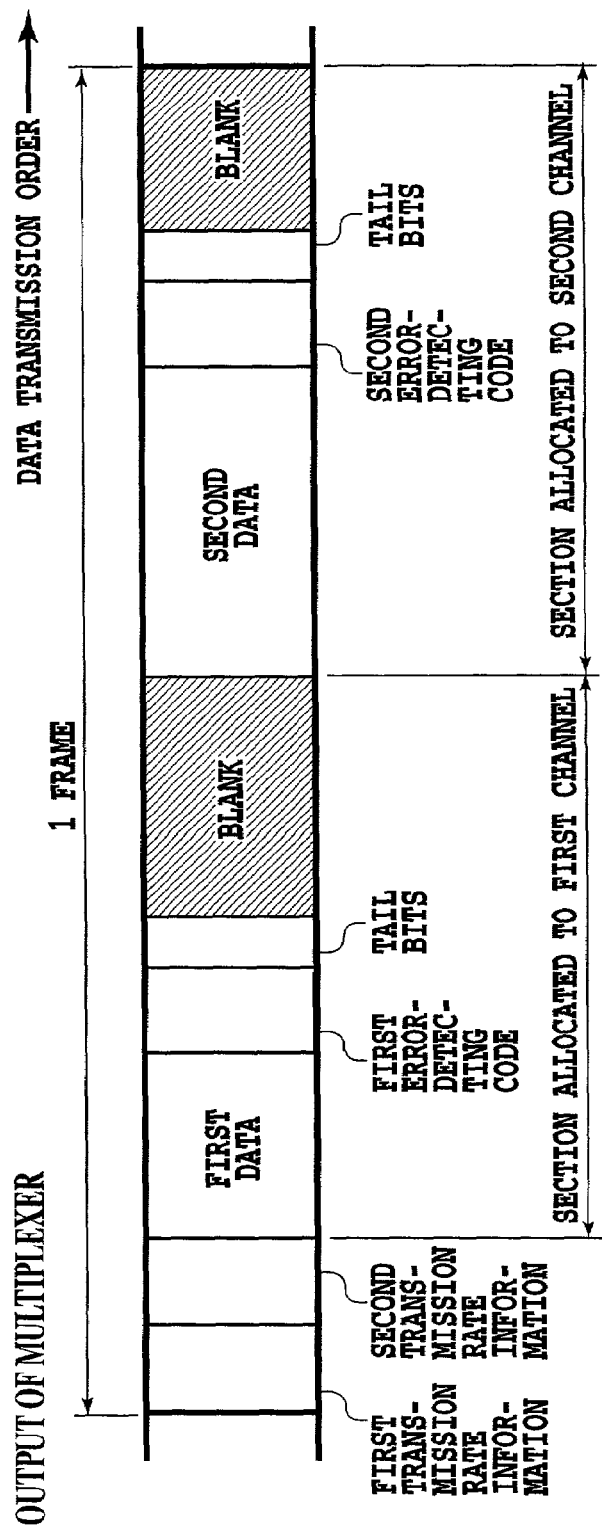
FIG. 16 is a diagram showing an example in which transmission data for two channels is contained in one frame.

FIG. 16 shows an example in which transmission data for two channels is contained in one frame. In FIG. 16, the data transmission method described in the second embodiment is applied to one (a first) channel of the two channels. One of the data transmission methods (the method in the second embodiment in which an error-detecting code is added even if there is no transmission data) described in WO00/79720, for example, is applied to the other channel (i.e. a second channel). Alternatively, a data transmission method may be used in which a transmission rate is determined by using only transmission rate information without using (adding) the error-detecting code for the second channel. In addition, if the transmission data over the second cannel is fixed-length data, a data transmission method in which no transmission rate determination is conducted for the second channel.

In the example shown in FIG. 16, first, transmission rate information about the first channel (first transmission rate information) and transmission rate information about the second channel (second transmission rate information) are placed in one frame. Then, a section (having a fixed length) allocated to the first channel and a section (having a fixed length) allocated to the second channel are provided and transmission data, an error-detecting code, and a tail bit for each channel are contained in each allocated section. If the frame contains no transmission data for first channel, neither the transmission data, error-detecting code, nor tail bit is contained in the section allocated to the first channel. The first and second transmission rate information may be contained in the respective sections allocated to the respective channels.

The transmission rate information about the channels may be combined into one piece of transmission rate information.

Figure 17:
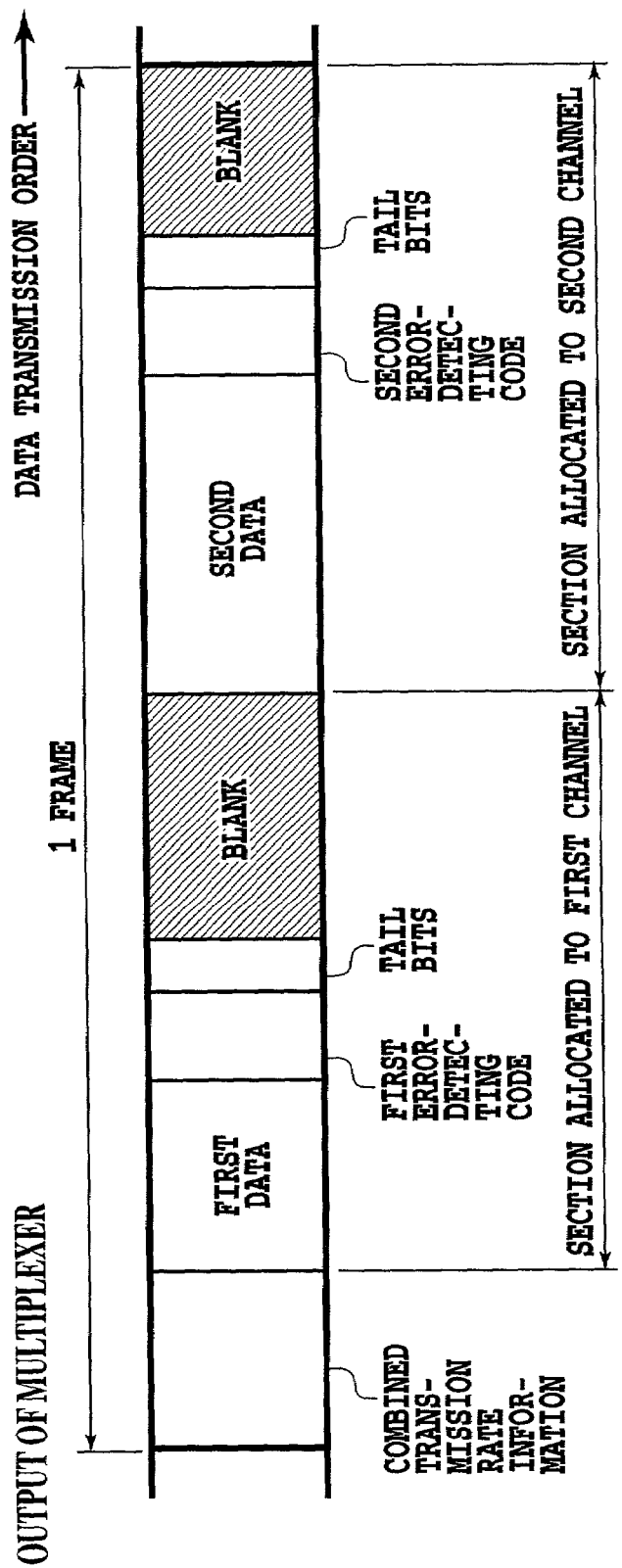
FIG. 17 is a diagram showing a frame in which two sets of transmission rate information shown in FIG. 16 are combined into one transmission rate information.

FIG. 17 shows the case where two sets of transmission rate information shown in FIG. 16 are combined into one transmission rate information. It is assumed that the transmission rate of the first channel can be one of five rates, 0 kbps, 10 kbps, 20 kbps, 30 kbps, and 40 kbps, and the transmission rate of the second channel can be one of three rates, 0 kbps, 50 kbps, and 100 kbps, for example. In this case, if separate items of transmission rate information as shown in FIG. 16 were used, 3 bits would be required for the first transmission rate information and 2 bits would be required for the second transmission rate information, thus requiring a total of 5 bits for the transmission rate information. On the other hand, if the combined transmission rate information as shown in FIG. 17 is used, the first channel transmission rate/second channel transmission rate can be indicated with one of 15 (=5×3) combinations, 0 kbps/0 kbps, 10 kbps/0 kbps, 20 kbps/0 kbps, ... , 20 kbps/100 kbps, 30 kbps/100 kbps, and 40 kbps/100 kbps, thus the combined transmission rate information requires only 4 bits.

Therefore, using the combined transmission rate information has the advantage of reducing overhead.

The transmission rate information about the first channel or second channel alone may be sent, or no transmission rate information (about both of the channels) may be sent. For example, the first channel transmission rate information is not sent and the method (transmission without transmission rate information) of the first embodiment may be used for the first channel instead of the method of the second embodiment (transmission with transmission rate information). If the second channel transmission rate information is not sent, one of the methods described in WO00/79720 (the method in the first embodiment in which an error-detecting code is added even if there is no transmission data) for example, may be used for the second channel.

The transmission rate information about all or none of the channels may be sent depending on the circuitry of a transmitter/receiver. This is because: there is the case where an error-correcting code (for example block coding) is also applied to transmission rate information and the error correction capability of the error-correcting coding (for example, convolutional coding) for a part containing an error-detecting code is relatively high (that is, the transmission quality of the transmission rate information is relatively low) and, in such a case, the error detection precision can be increased by detecting a transmission rate by using the error-detecting code without the help of the transmission rate information even if it is available. Here, if combined transmission rate information is used, it may not be required that the combined transmission rate information contain information about the transmission rate of a channel to which the method of the second embodiment is applied. If the combined transmission rate information does not contain the first channel transmission rate in the above-described example, the combined transmission rate information will consist of only the second channel transmission rate information, thus requiring only 2 bits. However, it is not always advantageous to over-refine a transmission format (to use a variable format) so as to transmit only a required number of transmission rate information bits, because it would generally complicate circuitry.

While the example has been described in which the method of the first or second embodiment is applied to one channel and none of them are applied to another channel, the method of first or second embodiment may be applied two or more channels or none of them may be applied to two or more channels.

The error-correcting coding may be performed by block coding the part of transmission rate information and convolutional coding the section allocated to each channel. The convolutional coding may be applied to the part of the transmission rate information as well. In this case, the convolutional coding may be applied to the transmission rate information and the section allocated to the first channel separately or collectively.

(Fourth Embodiment)

Dual closed loop transmission power control comprising inner loop transmission power control and outer loop transmission power control may be applied to data transmission in the third embodiment. One or more channels other than channels to which the method of the first or second embodiment is applied may be used as the reference of the outer loop transmission power control (hereinafter simply called "control reference").

For example, if channels to be multiplexed include a control signal transmission channel, the control signal transmission channel is not used as the control reference, instead, one or more of channels other than that channel may be used as the control reference. A control signal transmission channel cannot precisely provide outer loop transmission power control (block or frame error-rate quality maintenance control) based on, for example, the result of decision of a received CRC as the control reference, because information is generally transmitted intermittently.

The outer loop transmission power control is performed on the assumption that inner loop transmission power control is performed simultaneously. In particular, the outer loop transmission power control adjusts a target SIR (signal-to-interference-and-noise ratio) used for the inner loop transmission power control so that a frame (block) error rate quality, which is separately measured at the receiving side, becomes its target value. Inner loop transmission power control herein is control in which a receiving side compares the received SIR of a received signal with a predetermined (target) SIR, and if the received SIR is below the target SIR (that is, the received quality is below the target quality), sends a control signal to the sending side to cause it to increase the transmission power, and, if the received SIR exceeds the target SIR (that is, the received quality exceeds the target quality), sends a control signal to the sending side to cause it to reduce the transmission power.

In general, outer loop transmission power control (is dual closed loop control and) controls transmission power moderately compared with inner loop transmission power control. If a plurality of channels are multiplexed and a target frame (block) error rate quality is set for each channel, the target SIR used for the inner loop transmission power control is adjusted so as to satisfy all the target frame (block) error rate qualities.

The relative ratio between error-correcting coding ratios of the multiplexed channels and the relative ratio between transmission powers for the multiplexed channels can be fixed. The relative ratios may be decided in consideration of the required quality of each channel.

When the transmission power of the reference channel is determined by the outer loop transmission power control, the transmission powers of the other channels are also determined in the case where the relative ratios of the transmission powers are fixed. That is, the transmission powers of the channels other than the reference channel can be controlled indirectly.

In some cases, the transmission power of a channel may be changed according to its rate. In such a case, for example the relative ratio Q between the transmission power of a reference channel during the transmission at the maximum rate $R_{1,M}$ and the transmission power of a channel other than the reference channel during the transmission at the maximum rate $R_{2,M}$ is set at a fixed value. Let the relative ratio between the transmission power of the reference channel during transmission at a certain rate $R_{1,J}$ and the transmission power during transmission at the maximum rate $R_{1,M}$ be $S(R_{1,J})$, and the relative ratio between the transmission power of the non-reference channel during transmission at a certain rate $R_{2,K}$ and the transmission power during the transmission at the maximum rate $R_{2,M}$ be $S(R_{2,K})$. If the transmission power of the reference channel during the transmission at rate $R_{1,J}$ is determined to be $P_{1,J}$ then the transmission power $P_{2,K}$ of the non-reference channel during the transmission at rate $R_{2,K}$ can be determined by $P_{1,J} \times Q \times S(R_{2,K}) / S(R_{1,J})$.

(Others)

The techniques described in the first through fourth embodiments may be applied both to the case of "postposition and same order" (that is, a case where the error-detecting code is arranged after the transmitted data and the bit arrangements of the transmitted data and of the error-detecting code are set in the same order) and to the case of "preposition" (that is, a case where the error-detecting code is arranged ahead of the transmitted data and the bit arrangements may be in the same order or in a reverse order).

Figure 13C:
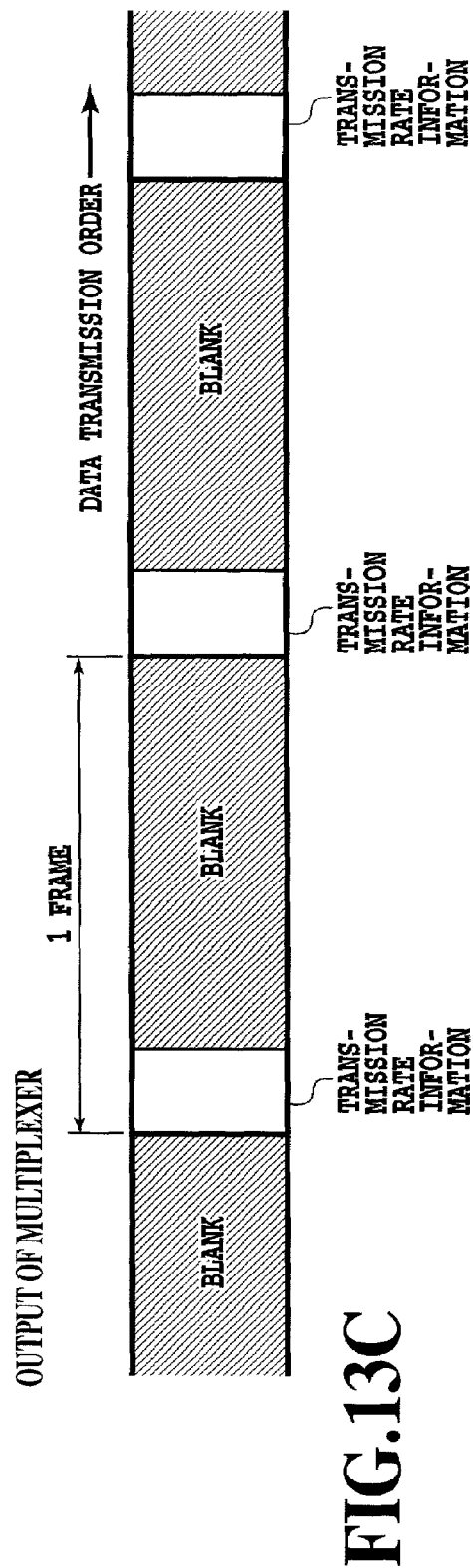
Figure 14C:
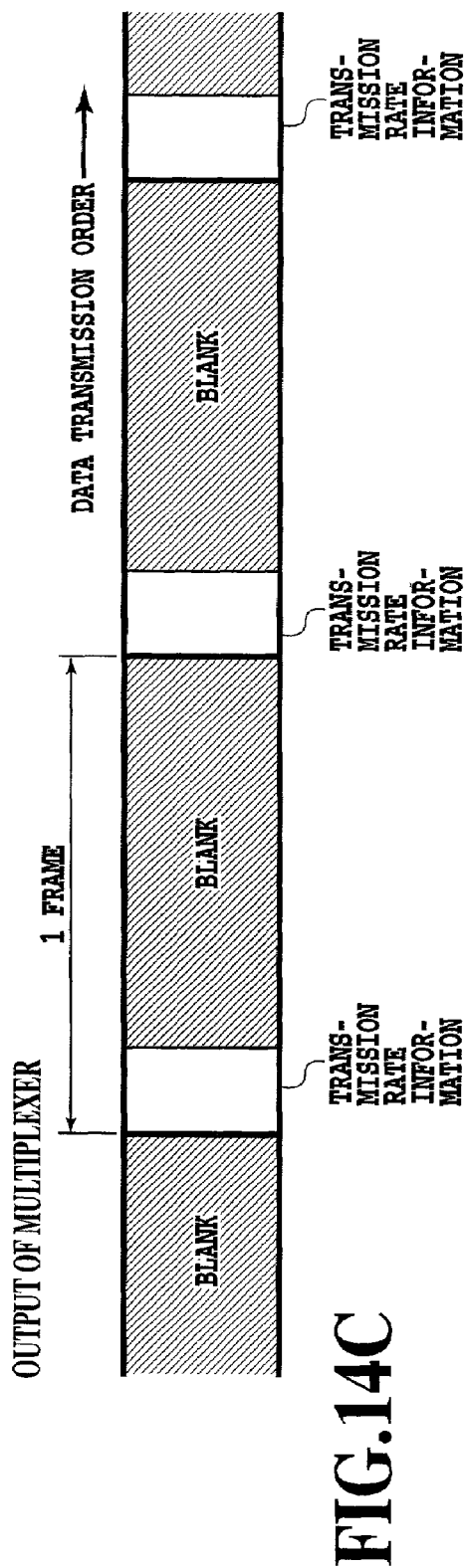
Figure 15A:
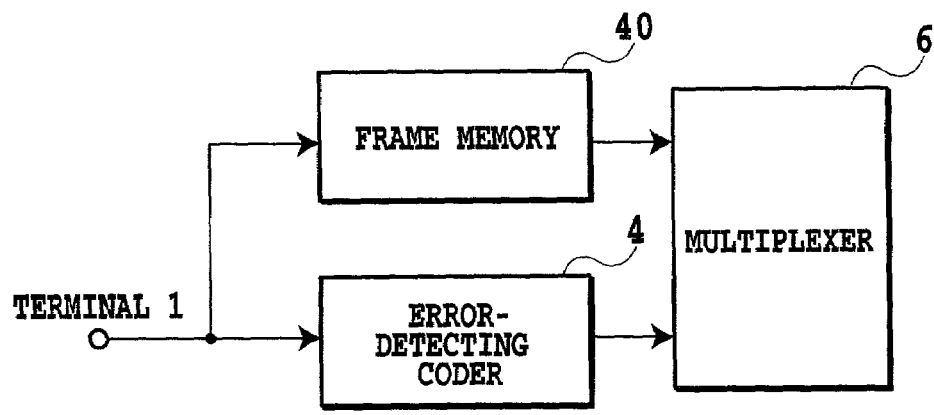
FIGS. 15A and 15B are diagrams showing examples where frame memory and error-detecting code memory are added to the configuration of the "preposition" case.
Figure 15B:
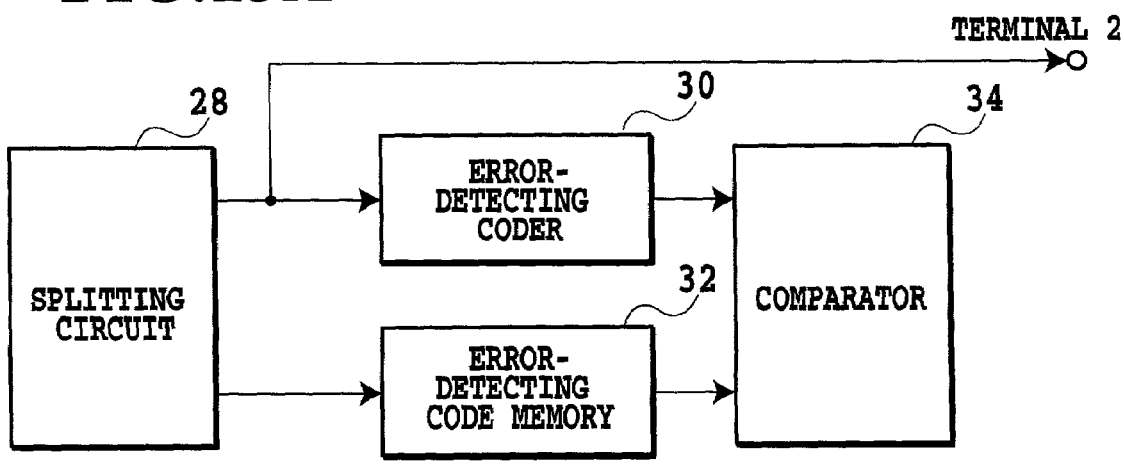

FIGS. 13A, 13B and 13C show examples of the frame configurations of the transmission data in the case of "postposition and same order" and FIGS. 14A, 14B and 14C show examples of the frame configurations of the transmission data in the case of "preposition". FIGS. 13A and 14A show cases where the transmission rate of the transmission data is at the maximum, FIGS. 13B and 14B show cases where the transmission rate is below the maximum rate and the frame contains transmission data, FIGS. 13C and 14C show cases where the frame contains no transmission data. Configuration examples of the transmitter and the receiver used in the case of "postposition and same order" and in the case of "preposition," a processing example, and the like are the same as those described with respect to the first through fourth embodiments. In addition, in the case of "preposition," as shown in FIGS. 15A and 15B, it is conceivable that, for example a frame memory 40 is provided between the terminal 1 and the multiplexer 6 and thereby the transmitted data is temporarily stored, and in the mean time the error-detecting code is calculated by the error-detecting coder 4. Moreover, it is conceivable that, for example, an error-detecting code memory 42 is provided between the demultiplexer 28 and the comparator 34 and thereby the assumed error-detecting code is temporarily stored, and in the meantime the error-detecting code of the assumed transmitted data is calculated by the error-detecting coder 30.

According to the present invention as described above, high-quality variable-rate data transmission can be achieved based on a precise rate detection while reducing overhead in accordance with the concept of blind rate detection in which rate information is not transmitted.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A data transmission method for placing variable-length transmission data in each frame having a fixed time length to transmit the frame, a length of the transmission data being one of two values, X (X≠0) and 0, the data transmission method comprising the steps of:

at a transmitting side,
calculating an error-detecting code of the transmission data in the frame only if the frame contains the transmission data;
generating frame data containing the transmission data and the calculated error-detecting code of the transmission data if the frame contains the transmission data, and generating frame data that contains neither the transmission data nor the error-detecting code of the transmission data if the frame does not contain the transmission data; and
transmitting the generated frame data; and at a receiving side,
receiving the frame data;
determining the transmission data and the error-detecting code of the transmission data by determining a predetermined position in the received frame data as the final bit position of the frame data, and calculating an error-detecting code based on the determined transmission data;
deciding that the frame contains the transmission data if the determined error-detecting code matches the error-detecting code calculated based on the determined transmission data, and deciding that the frame data does not contain the transmission data or the received frame data contains an error if the determined error-detecting code does not match the calculated error-detecting code; and
obtaining the transmission data in the frame based on the result of the decision,
wherein at the receiving side, the step of determining and calculating determines the transmission data and the error-detecting code based on the final bit position where the length of the transmission data is X, and calculates the error-detecting code based on the determined transmission data, and
wherein, at the transmitting side, the step of generating the frame data generates the frame data in which the error-detecting code is placed after the corresponding transmission data and the bits of the error-detecting code are arranged in the order that is the reverse of the order of the bits of the transmission data.

2. A data transmission method for placing variable-length transmission data in each frame having a fixed time length to transmit the frame, a length of the transmission data being one of two values, X (X≠0) and 0, the data transmission method comprising the steps of:

at a transmitting side,
calculating an error-detecting code of the transmission data in the frame only if the frame contains the transmission data;
generating frame data containing the transmission data and the calculated error-detecting code of the transmission data if the frame contains the transmission data, and generating frame data that contains neither the transmission data nor the error-detecting code of the transmission data if the frame does not contain the transmission data; and
transmitting the generated frame data; and at a receiving side,
receiving the frame data;
determining the transmission data and the error-detecting code of the transmission data by determining a predetermined position in the received frame data as the final bit position of the frame data, and calculating an error-detecting code based on the determined transmission data;
deciding that the frame contains the transmission data if the determined error-detecting code matches the error-detecting code calculated based on the determined transmission data, and deciding that the frame data does not contain the transmission data or the received frame data contains an error if the determined error-detecting code does not match the calculated error-detecting code; and
obtaining the transmission data in the frame based on the result of the decision,
wherein at the receiving side, the step of determining and calculating determines the
transmission data and the error-detecting code based on the final bit position where the length of the transmission data is X, and calculates the error-detecting code based on the determined transmission data, wherein the data transmission method multiplexes variable-length transmission data for channels in a first channel group of one or more channels and transmission data for channels in a second channel group of one or more channels into each frame having a fixed time length to transmit the frame, and wherein at the transmitting side, the step of calculating the error-detecting code calculates, for each channel in the first channel group, the error-detecting code of the transmission data only if the frame contains the transmission data for that channel;

the step of generating the frame data generates, for each channel in the first channel group, partial frame data containing the transmission data for the channel and the calculated error-detecting code of the transmission data for the channel if the frame contains the transmission data for the channel, and generates, for each channel in the first channel group, partial frame data containing neither the transmission data for the channel nor the error-detecting code of the transmission data for the channel if the frame does not contain the transmission data for the channel; and the step of transmitting the frame data transmits the whole frame data containing the generated partial frame data for each channel in the first channel group, and wherein at the receiving side, the step of receiving the frame data receives the whole frame data;

the step of calculating the error-detecting code determines the transmission data for each channel in the first channel group and the error-detecting code of the transmission data for the channel by determining a predetermined position in the partial frame data for the channel contained in the received whole frame data as the final bit position and calculates an error-detecting code based on the decided transmission data for the channel;

the step of deciding decides, for each channel in the first channel group, that the partial frame data for the channel contains the transmission data for the channel if the determined error-detecting code of the determined transmission data for the channel matches the error-detecting code calculated based on the determined transmission data for the channel, and decides, for each channel in the first channel group, that the frame does not contain the transmission data for the channel or the partial frame data for the channel contains an error if the determined error-detecting code of the determined transmission data for the channel does not match the error-detecting code calculated based on the determined transmission data for the channel; and the step of obtaining the transmission data obtains the transmission data for each channel in the first channel group in the frame based on the result of the decision.

3. A data transmission method for placing variable-length transmission data in each frame having a fixed time length to transmit the frame, comprising the steps of:

at a transmitting side, calculating an error-detecting code of the transmission data in the frame only if the frame contains the transmission data;

generating frame data containing the transmission data and the calculated error-detecting code of the transmission data if the frame contains the transmission data, and generating frame data that contains neither the transmission data nor the error-detecting code of the transmission data if the frame does not contain the transmission data; and transmitting the generated frame data; and at a receiving side, receiving the frame data;

assuming the transmission data and the error-detecting code of the transmission data by assuming one or more final bit positions of the received frame data, and calculating an error-detecting code based on the assumed transmission data;

deciding a position to be the final bit position of the frame data if there is the position in the frame where the assumed error-detecting code matches the error-detecting code calculated based on the assumed transmission data among the assumed final bit positions of the frame data, and deciding that the frame does not contain the transmission data or the received frame data contains an error if there is no position where the assumed error-detecting code matches the calculated error-detecting code; and obtaining the transmission data in the frame based on the result of the decision, wherein the data transmission method multiplexes variable-length transmission data for channels in a first channel group of one or more channels and transmission data for channels in a second channel group of one or more channels into each frame having a fixed time length to transmit the frame, and at the transmitting side, the step of calculating the error-detecting code calculates the error-detecting code of the transmission data for each channel in the first channel group only if the frame contains the transmission data for the channel;

the step of generating the frame data generates, for each channel in the first channel group, partial frame data containing the transmission data for the channel and the calculated error-detecting code of the transmission data for the channel if the frame contains the transmission data for the channel, and generates, for each channel in the first channel group, partial frame data containing neither the transmission data for the channel nor the error-detecting code of the transmission data for the channel if the frame does not contains the transmission data for the channel; and the step of transmitting the frame data transmits the whole frame data containing the generated partial frame data for each channel in the first channel group, and at the receiving side, the step of receiving the frame data receives the whole frame data;

the step of calculating the error-detecting code assumes the transmission data for each channel in the first channel group and the error-detecting code of the transmission data for the channel by assuming one or more final bit positions of the partial frame data for the channel contained in the received whole frame data and calculates an error-detecting code based on the assumed transmission data for the channel;

the step of deciding decides, for each channel in the first channel group, a position to be the final bit position of the partial frame data for the channel if there is the position where the assumed error-detecting code of the transmission data for the channel matches the error-detecting code calculated based on the assumed transmission data for the channel among the assumed final bit positions of the partial frame data for the channel, and decides, for each channel in the first channel group, that the frame does not contain the transmission data for the channel or the partial frame data for the channel contains an error if there is no position where the assumed error-detecting code of the transmission data for the channel matches the error-detecting code calculated based on the assumed transmission data for the channel among the assumed final bit positions of the partial frame data for the channel; and the step of obtaining the transmission data obtains the transmission data for each channel in the first channel group in the frame based on the result of the decision.

4. The data transmission method as claimed in claim 2 or 3, wherein dual closed loop transmission power control comprising inner loop transmission power control and outer loop transmission power control is performed for the data transmission between the transmitting side and the receiving side and one or more channels in the second channel group are used as the reference for the outer loop transmission power control without using channels in the first channel group as the reference.

5. The data transmission method as claimed in claim 4, wherein the relative ratio between error-correcting coding ratios of the multiplexed channels and the relative ratio between transmission powers for the multiplexed channels are fixed.

* * * * *

UNITED STATES PATENT AND TRADEMARK OFFICE
CERTIFICATE OF CORRECTION

| | |
|---|---|
| PATENT NO. | : 7,139,243 B2 |
| APPLICATION NO. | : 09/998601 |
| DATED | : November 21, 2006 |
| INVENTOR(S) | : Yushihiko Okumura |

It is certified that error appears in the above-identified patent and that said Letters Patent is hereby corrected as shown below:

Title Page
Page 2, Column 1, Foreign Patent Documents, add the following reference:
--JP     WO98/47253          10/1998--
Page 2, Column 2, Other Publications, add the following publications:
--"3rd Generation Partnership Project; Technical Specification Group Radio Access Network;
Multiplexing and channel coding (FDD) (Release 1999)" pg marked in file--
--Official Notice of Rejection (translation) Mailing No.: 9-5-2004-020632812--

Column 10
Line 48, change "bites" to --bits--
Line 59, change "shows" to --show--

Column 11
Line 22, before "frame", change "s" to --a--

Column 14
Line 27, before "low", change "to" to --too--
Line 39, change "positions" to --position--

Column 15
Line 4, change "red" to --read--

Column 16
Line 47, before "low", change "to" to --too--

Column 18
Line 41, before "first", insert --the--

Column 19
Line 45, before "two", insert --to--

UNITED STATES PATENT AND TRADEMARK OFFICE
CERTIFICATE OF CORRECTION

PATENT NO. : 7,139,243 B2  
APPLICATION NO. : 09/998601  
DATED : November 21, 2006  
INVENTOR(S) : Yushihiko Okumura It is certified that error appears in the above-identified patent and that said Letters Patent is hereby corrected as shown below:

<u>Column 21</u>
Line 29, change "42" to --32--

Signed and Sealed this

Twenty-fifth Day of December, 2007

JON W. DUDAS
*Director of the United States Patent and Trademark Office*